(12) United States Patent
Zheng et al.

(10) Patent No.: US 12,366,202 B2
(45) Date of Patent: Jul. 22, 2025

(54) BLEED VALVE ASSEMBLIES

(71) Applicant: General Electric Company, Schenectady, NY (US)

(72) Inventors: Li Zheng, Niskayuna, NY (US); Nicholas J. Kray, Evendale, OH (US); Changjie Sun, Clifton Park, NY (US); Thomas Malkus, Albany, NY (US); Giridhar Jothiprasad, Clifton Park, NY (US); Mitchell J. Headley, Lebanon, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 17/578,062

(22) Filed: Jan. 18, 2022

(65) Prior Publication Data

US 2023/0228219 A1  Jul. 20, 2023

(51) Int. Cl.
*F02C 6/08* (2006.01)
*F02C 9/18* (2006.01)
*F04D 27/02* (2006.01)

(52) U.S. Cl.
CPC .............. *F02C 6/08* (2013.01); *F02C 9/18* (2013.01); *F04D 27/0215* (2013.01)

(58) Field of Classification Search
CPC ........................................................ F02C 6/08
See application file for complete search history.

(56) References Cited

U.S. PATENT DOCUMENTS

| | | | |
|---|---|---|---|
| 3,057,541 A | 10/1962 | Augustus et al. | |
| 3,227,241 A | 1/1966 | Mattoon | |
| 3,291,420 A | 12/1966 | Laing | |
| 3,588,268 A | 6/1971 | Hampton | |
| 3,638,428 A * | 2/1972 | Shipley | F02K 3/075 415/149.1 |
| 3,898,799 A * | 8/1975 | Pollert | F04D 27/023 60/785 |
| 4,086,761 A | 5/1978 | Schaut et al. | |

(Continued)

FOREIGN PATENT DOCUMENTS

| | | |
|---|---|---|
| DE | 1114979 | 10/1961 |
| FR | 3129428 A1 | 5/2023 |

(Continued)

OTHER PUBLICATIONS

Pelat et al., "The Acoustic Black Hold: A Review of Theory and Applications," Elsevier, Journal of Sound and Vibration, 476, 115316, Mar. 18, 2020, 24 pages.

(Continued)

*Primary Examiner* — Todd E Manahan
*Assistant Examiner* — Alyson Joan Harrington
(74) *Attorney, Agent, or Firm* — HANLEY, FLIGHT & ZIMMERMAN, LLC

(57) ABSTRACT

Methods, apparatus, systems, and articles of manufacture are disclosed for a variable bleed valve assembly. An example variable bleed valve assembly a variable bleed valve (VBV) door corresponding to a bleed port and a first unison ring, the VBV door coupled to the first unison ring, the first unison ring to move in a circumferential direction between a first position and a second position causing the VBV door to move between the first position and the second position.

19 Claims, 12 Drawing Sheets

(56) References Cited

U.S. PATENT DOCUMENTS

| | | |
|---|---|---|
| 4,421,455 A | 12/1983 | Tomren |
| 4,463,552 A | 8/1984 | Monhardt et al. |
| 4,698,964 A | 10/1987 | Glancy |
| 5,123,240 A | 6/1992 | Frost et al. |
| 5,845,482 A | 12/1998 | Carscallen |
| 6,048,171 A | 4/2000 | Donnelly et al. |
| 6,565,313 B2 | 5/2003 | Nikkanen et al. |
| 6,981,842 B2 | 1/2006 | Gary |
| 7,017,706 B2 | 3/2006 | Brown et al. |
| 7,249,735 B2 | 7/2007 | Amorosi et al. |
| 7,594,403 B2 | 9/2009 | Cadieux |
| 8,590,308 B2 | 11/2013 | Kirby |
| 8,683,812 B2 | 4/2014 | Bertolotti et al. |
| 8,690,521 B2 | 4/2014 | Colotte et al. |
| 8,931,284 B2 | 1/2015 | Hussain et al. |
| 9,175,577 B2 | 11/2015 | Papamoschou et al. |
| 9,518,513 B2 | 12/2016 | Pritchard, Jr. et al. |
| 9,623,354 B2 | 4/2017 | Kumar et al. |
| 9,657,844 B2 | 5/2017 | Hrdlichka et al. |
| 9,982,598 B2 | 5/2018 | Pritchard, Jr. et al. |
| 10,024,228 B2 | 7/2018 | Gong et al. |
| 10,208,676 B2 | 2/2019 | Johnson et al. |
| 10,215,047 B2 | 2/2019 | Moniz et al. |
| 10,704,726 B2 | 7/2020 | Lin et al. |
| 10,830,179 B2 | 11/2020 | Hatim |
| 2002/0139900 A1 | 10/2002 | Porte |
| 2007/0137175 A1 | 6/2007 | Moniz |
| 2010/0223903 A1 | 9/2010 | Starr |
| 2012/0070271 A1 | 3/2012 | Urban et al. |
| 2012/0288359 A1 | 11/2012 | Pichel |
| 2013/0340440 A1 | 12/2013 | Leblanc |
| 2014/0034416 A1 | 2/2014 | Zheji |
| 2014/0075956 A1 | 3/2014 | Patsouris |
| 2014/0245747 A1* | 9/2014 | Pritchard, Jr. ...... F04D 27/0215 60/785 |
| 2016/0017775 A1 | 1/2016 | Mattia |
| 2016/0153361 A1 | 6/2016 | Morin et al. |
| 2020/0017189 A1 | 1/2020 | Kruckenberg |
| 2020/0232357 A1 | 7/2020 | Bertoldi |
| 2023/0228219 A1 | 7/2023 | Zheng et al. |

FOREIGN PATENT DOCUMENTS

| | | |
|---|---|---|
| FR | 3129432 A1 | 5/2023 |
| FR | 3130879 A1 | 6/2023 |
| FR | 3130894 A1 | 6/2023 |
| FR | 3132743 A1 | 8/2023 |
| GB | 785955 | 11/1957 |

OTHER PUBLICATIONS

Xiaoqi et al., "Broadband and Low Frequency Sound Absorption by Sonic Black Holes With Micro-Perforated Boundaries," ScienceDirect, Journal of Sound and Vibration, vol. 512, 116401, Nov. 10, 2021, 17 pages.

Mousavi et al., "How The Waveguide Acoustic Black Hole Works: A Study of Possible Dampening Mechanisms," The Journal of the Acoustical Society of America. vol. 151, 4279-4290, Jun. 29, 2022, 13 pages.

Bravo et al., "Broadband Sound Attenuation and Absorption by Duct Silencers Based on the Acoustic Black Hole Effect: Simulations and Experiments," Elsvier, Journal of Sound and Vibration, May 26, 2023, 34 pages.

United States Patent and Trademark Office, "Non-Final Office Action," issued in connection with U.S. Appl. No. 18/440,383, dated Jun. 17, 2025, 15 pages.

* cited by examiner

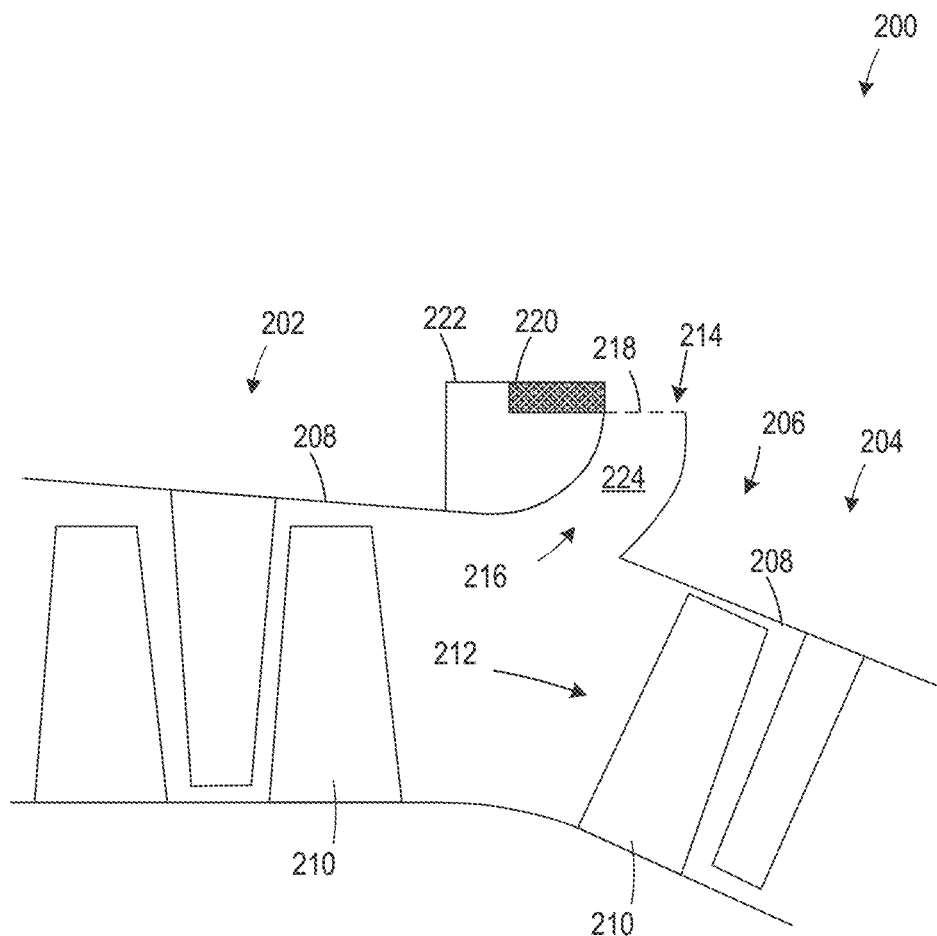
FIG. 2
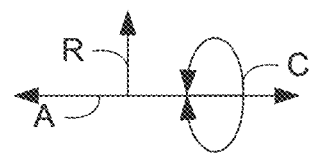

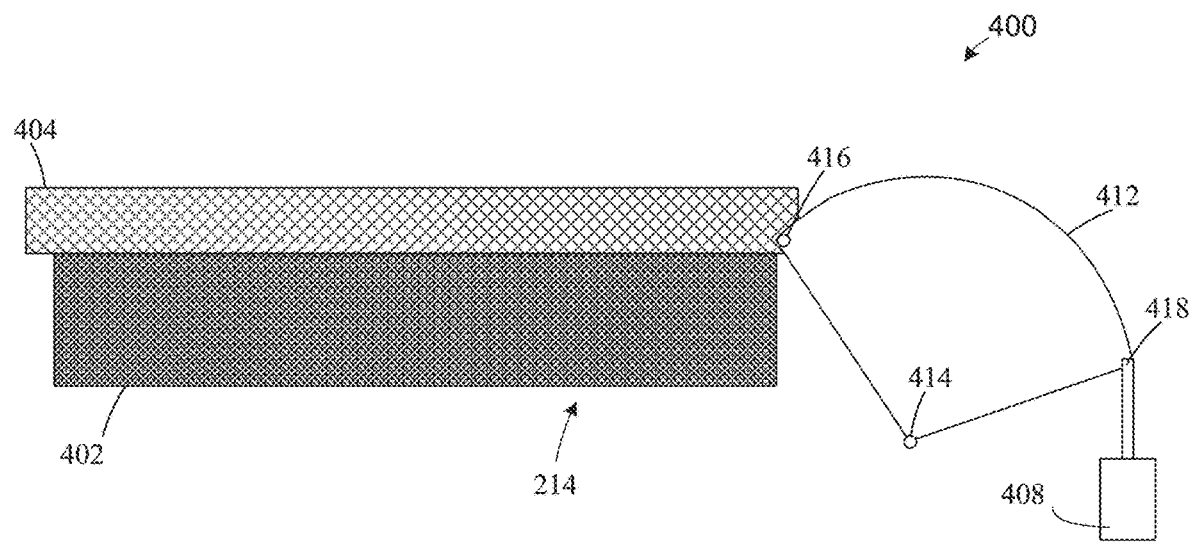
FIG. 5A
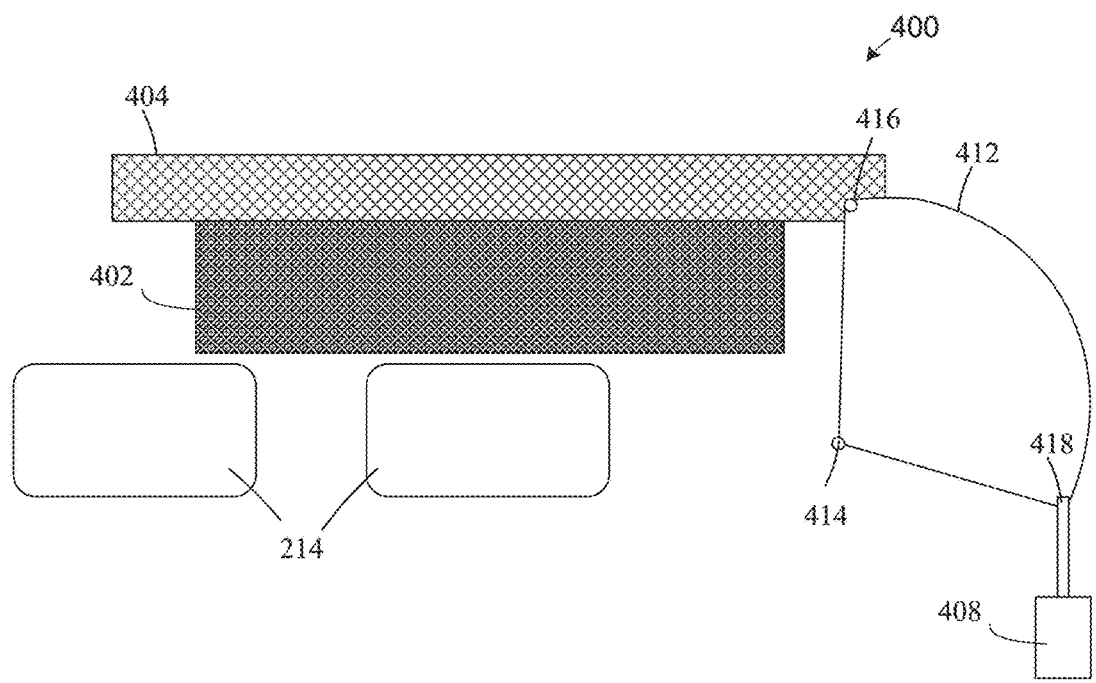
FIG. 5B
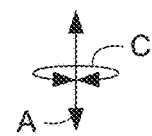

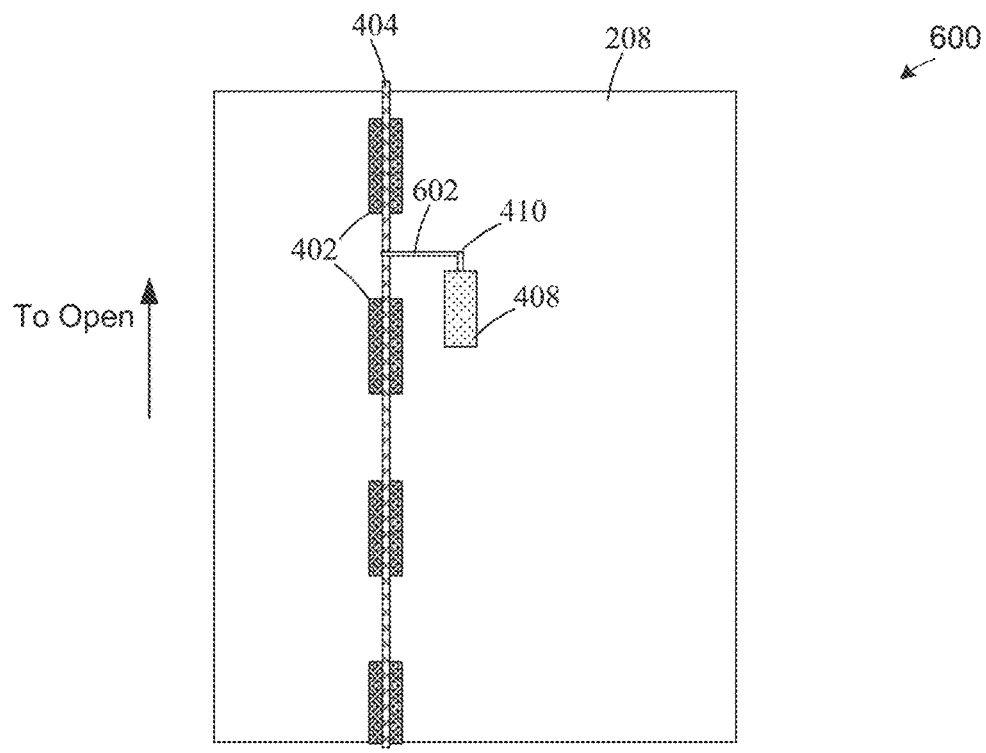
FIG. 6A
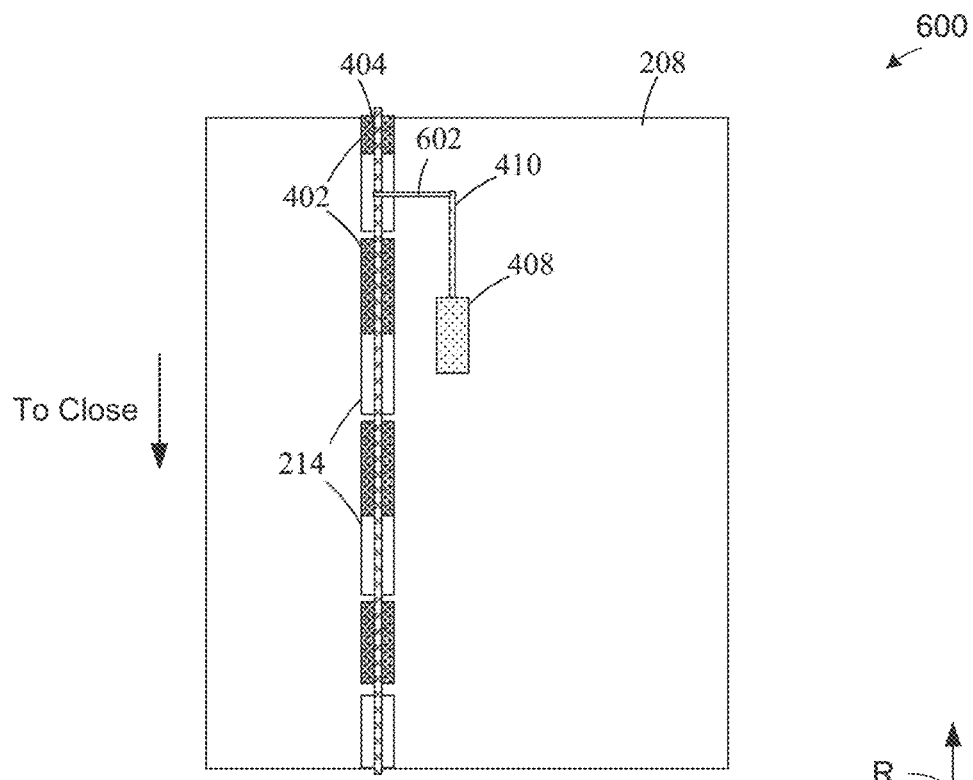
FIG. 6B
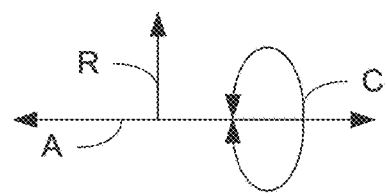

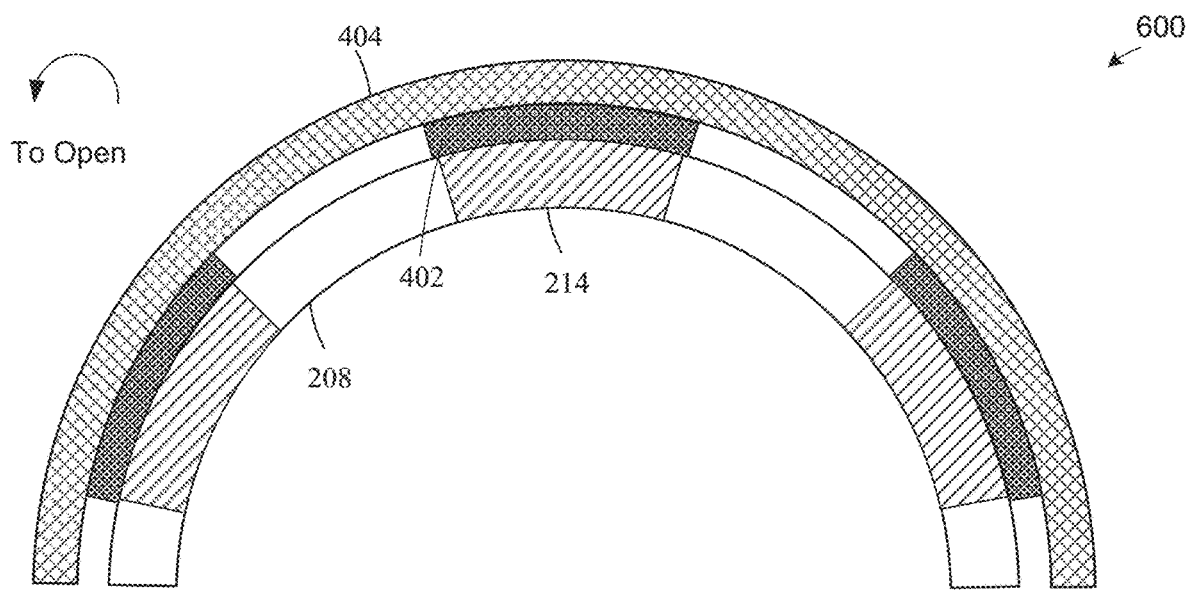
FIG. 7A
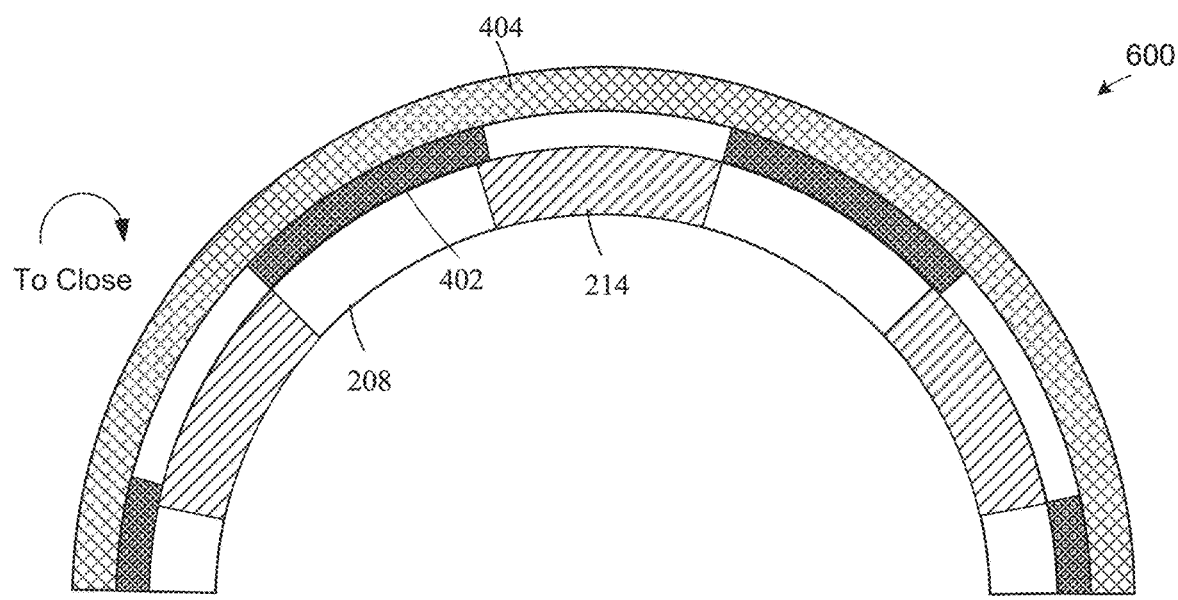
FIG. 7B
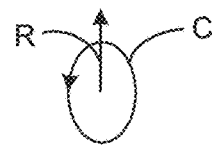

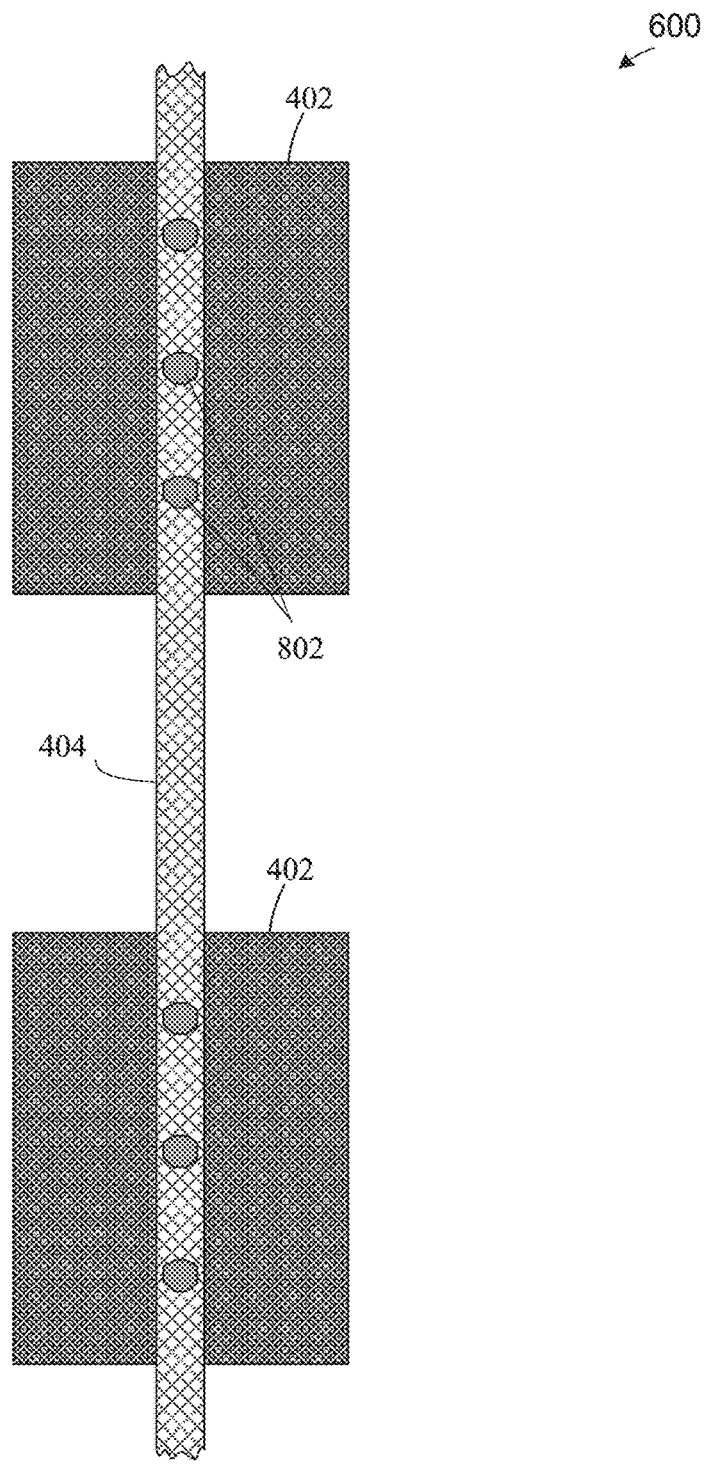
FIG. 8
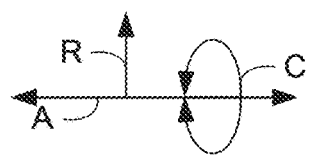

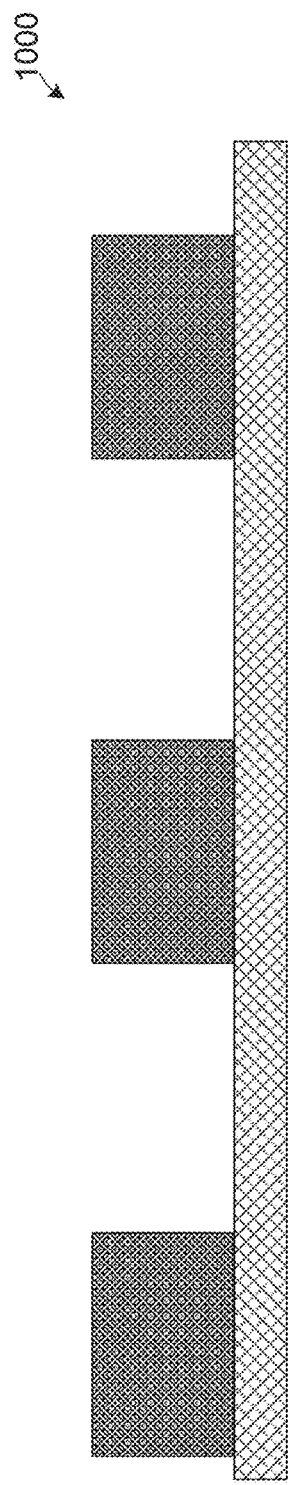
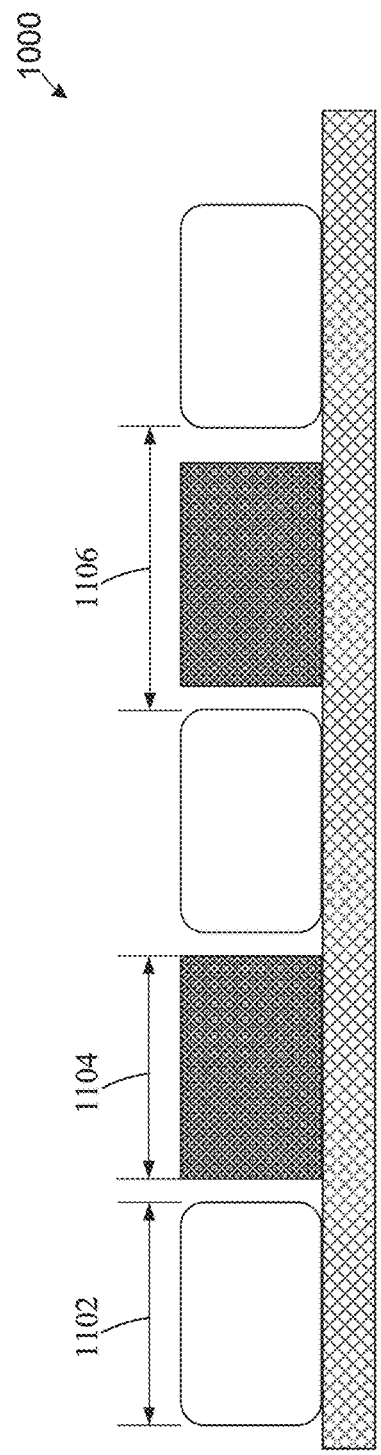
FIG. 11A
FIG. 11B

BLEED VALVE ASSEMBLIES

FIELD OF THE DISCLOSURE

This disclosure relates generally to turbine engines and, more particularly, to various bleed valve assemblies.

BACKGROUND

Turbine engines are some of the most widely-used power generating technologies, often being utilized in aircraft and power-generation applications. A turbine engine generally includes a fan and a core arranged in flow communication with one another. The core of the turbine engine generally includes, in serial flow order, a compressor section, a combustion section, a turbine section on the same shaft as the compressor section, and an exhaust section. Typically, a casing or housing surrounds the core of the turbine engine.

BRIEF DESCRIPTION OF THE DRAWINGS

FIG. 2 is illustration of an example variable bleed valve port for which examples disclosed herein may be implemented.

FIGS. 5A and 5B illustrate partial radial views of the example variable bleed valve assembly of FIGS. 4A and 4B in accordance with the teachings of this disclosure.

FIGS. 6A and 6B illustrate another example variable bleed valve assembly structured in accordance with the teachings of this disclosure.

FIGS. 7A and 7B illustrate partial circumferential views of the example variable bleed valve assembly of FIGS. 6A and 6B structured in accordance with the teachings of this disclosure.

FIG. 8 is an illustration of the example variable bleed valve assembly of FIGS. 6A-6B, 7A-7B, and/or 9A-9B structured in accordance with the teachings of this disclosure.

FIGS. 11A and 11B illustrate partial radial views of the example variable bleed valve assembly of FIGS. 10A and 10B in accordance with the teachings of this disclosure.

Figure 1:
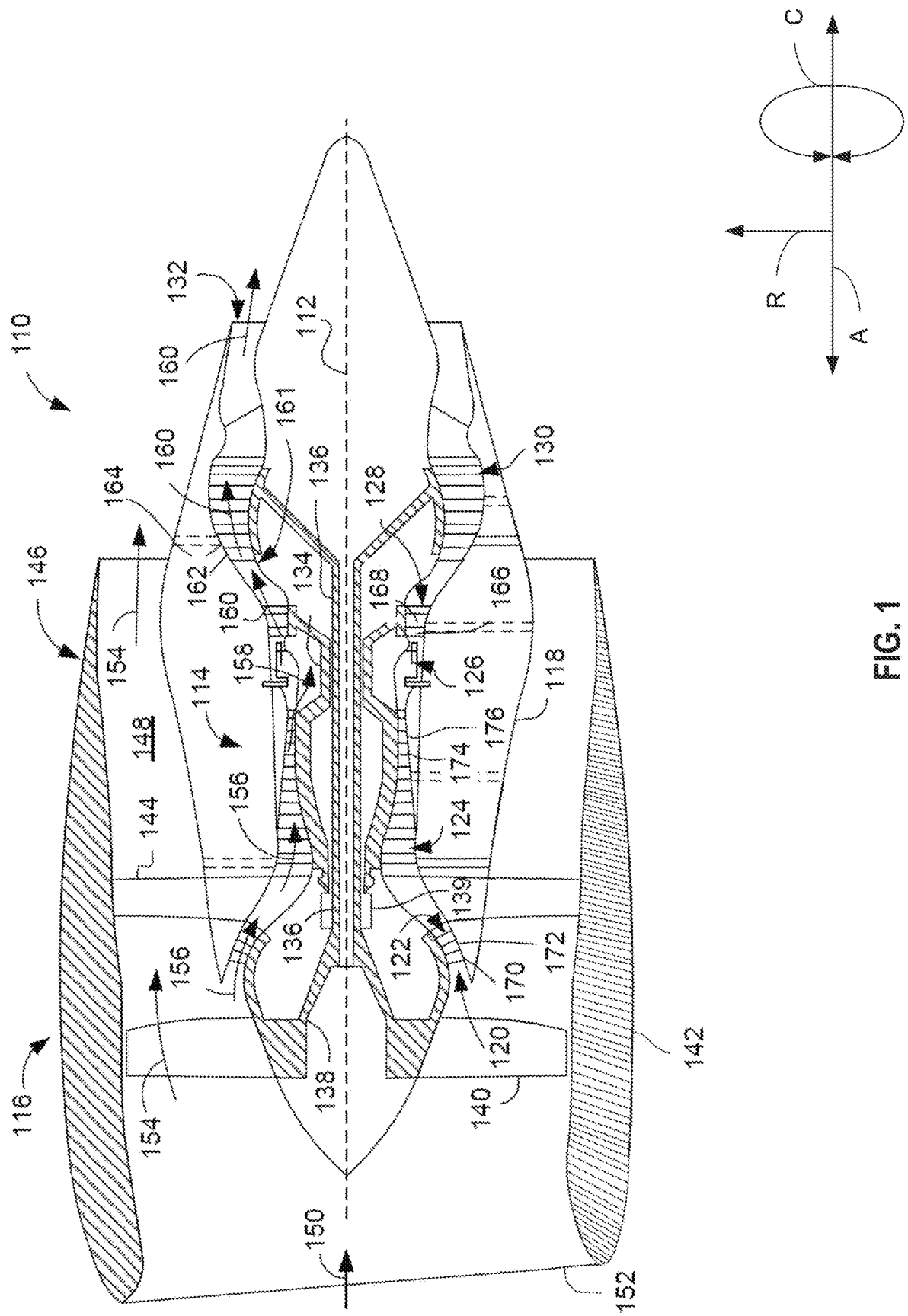
FIG. 1 is a cross-sectional view of an example gas turbine engine in which examples disclosed herein may be implemented.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In some examples used herein, the term "substantially" is used to describe a relationship between two parts that is within three degrees of the stated relationship (e.g., a substantially collinear relationship is within three degrees of being linear, a substantially perpendicular relationship is within three degrees of being perpendicular, a substantially same relationship is within three degrees of being the same, a substantially flush relationship is within three degrees of being flush, etc.).

The terms "upstream" and "downstream" refer to the relative direction with respect to fluid flow in a fluid pathway. For example, "upstream" refers to the direction from which the fluid flows, and "downstream" refers to the direction to which the fluid flows. Various terms are used herein to describe the orientation of features. In general, the attached figures are annotated with reference to the axial direction, radial direction, and circumferential direction of the vehicle associated with the features, forces and moments. In general, the attached figures are annotated with a set of axes including the axial axis A, the radial axis R, and the circumferential axis C.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken limiting on the scope of the subject matter described in this disclosure. Certain features from different aspects of the following description may be combined to form yet new aspects of the subject matter discussed below.

DETAILED DESCRIPTION

A turbine engine, also referred to herein as a gas turbine engine, is a type of internal combustion engine that uses atmospheric air as a moving fluid. In operation, atmospheric air enters the turbine engine via a fan and flows through a compressor section where one or more compressors progressively compresses (e.g., pressurizes) the air until it reaches the combustion section. In the combustion section, the pressurized air is combined with fuel and ignited to produce a high-temperature, high-pressure gas stream (e.g., hot combustion gas) before entering the turbine section. The hot combustion gases expand as they flow a through a turbine section, causing rotating blades of one or more turbines to spin. The rotating blades of the turbine produce a spool work output that powers a corresponding compressor. The spool is a combination of the compressor, a shaft, and the turbine. Turbine engines often include multiple spools, such as a high pressure spool (e.g., HP compressor, shaft, and turbine) and a low pressure spool (e.g., LP compressor, shaft, and turbine). However, a turbine engine can include one spool or more than two spools in additional or alternative examples.

During low speed operation of the turbine engine (e.g., during start-up and/or stopping), equilibrium of the engine is adjusted. In many scenarios, a delay is needed for the spool(s) to adapt (e.g., a time for a rotational speed to adjust for a new equilibrium). However, the compressor cannot stop producing pressurized air for fuel combustion during operation. Such a result may cause the turbine to stop producing the power to turn the compressor, causing the compressor itself to stop compressing air. Accordingly, throttling changes may lead to compressor instabilities, such as compressor stall and/or compressor surge. Compressor stall is a circumstance of abnormal airflow resulting from the aerodynamic stall of rotor blades within the compressor. Compressor stall causes the air flowing through the compressor to slow down or stagnate. $In some cases, the disruption of air flow as the air passes through various stages of the compressor can lead to compressor surge. Compressor surge refers to a stall that results in disruption (e.g., complete disruption, majority disruption, other partial disruption, etc.) of the airflow through the compressor.

A variable bleed valve (VBV) is often integrated into a compressor to increase efficiency and limit possible stalls. The VBV enables the turbine engine to bleed air from a compressor section of the turbine engine during operation. An example VBV assembly includes a VBV port (e.g., opening, air bleed slot, etc.) in a compressor casing that opens via actuation of a VBV door. In other words, the VBV is configured as a door that opens to provide a bleed flowpath to bleed off compressed air between a booster (e.g., a low pressure compressor) and a core engine compressor of a gas turbine. For example, the VBV door may be actuated during a speed-speed mismatch between the LP spool and the HP spool. During start-up or stopping, the HP spool may spin at a lower speed than the LP spool. Opening the VBV port allows the LP spool to maintain its speed while reducing the amount of air that is flowing through the axial compressor by directing some of the air flow to the turbine exhaust area. Thus, the VBV door enables the LP spool (e.g., booster) to operate on a lower operating line and further away from a potential instability or stall condition.

When a VBV is in a closed position, the VBV door may not be flush with the compressor casing, resulting in a bleed cavity that is open to a main flow path within the compressor. This results in aerodynamic performance losses in the main flow path and/or flow induced cavity oscillations. Further, current VBV assemblies include numerous components to actuate the VBV to bleed off compressed air. Such multiplicity of components adds unnecessary weight to the VBV design and may occupy more space than needed. Additionally, the inclusion of additional components likely raises a cost of the VBV assembly. Accordingly, a new VBV assembly is needed that addresses the issues described above.

Examples disclosed herein enable manufacture of a VBV assembly that improves aerodynamic performance and/or efficiency of a turbine engine. Certain examples enable a VBV assembly in which a surface of a VBV door is flush with a casing wall when the VBV door is in a closed position. Accordingly, certain examples eliminate or otherwise reduce a volume of the bleed cavity. Certain examples enable lighter VBV assemblies that occupy less space. Certain examples thus improve aerodynamic efficiency and minimize or otherwise reduce aero-acoustic excitations in the bleed cavity.

Examples disclosed herein enable manufacture of a variety of VBV assemblies. In some examples, a sliding door is used to move a VBV between a closed and open position. Certain examples include a unison ring (e.g., actuation ring, bleed ring, etc.) that is utilized to actuate a plurality of VBV doors (e.g., blocker doors) concurrently. In some examples, a plurality of unison rings are utilized, enabling a sub-set of VBV doors to actuate concurrently. Certain examples enable partial actuation of a VBV door (e.g., the VBV door opens and/or closes partially).

Referring now to the drawings, wherein identical numerals indicate the same elements throughout the figures, FIG. 1 is a schematic cross-sectional view of an example high-bypass turbofan-type gas turbine engine 110 ("turbofan engine 110"). While the illustrated example is a high-bypass turbofan engine, the principles of the present disclosure are also applicable to other types of engines, such as low-bypass turbofans, turbojets, turboprops, etc. As shown in FIG. 1, the turbofan engine 110 defines a longitudinal or axial centerline axis 112 extending therethrough for reference. FIG. 1 also includes an annotated directional diagram with reference to an axial direction A, a radial direction R, and a circumferential direction C. In general, as used herein, the axial direction A is a direction that extends generally parallel to the centerline axis 112, the radial direction R is a direction that extends orthogonally outwardly from the centerline axis 112, and the circumferential direction C is a direction that extends concentrically around the centerline axis 112.

In general, the turbofan engine 110 includes a core turbine or gas turbine engine 114 disposed downstream from a fan section 116. The core turbine 114 includes a substantially tubular outer casing 118 that defines an annular inlet 120. The outer casing 118 can be formed from a single casing or multiple casings. The outer casing 118 encloses, in serial flow relationship, a compressor section having a booster or low pressure compressor 122 ("LP compressor 122") and a high pressure compressor 124 ("HP compressor 124"), a combustion section 126, a turbine section having a high pressure turbine 128 ("HP turbine 128") and a low pressure turbine 130 ("LP turbine 130"), and an exhaust section 132. A high pressure shaft or spool 134 ("HP shaft 134") drivingly couples the HP turbine 128 and the HP compressor 124. A low pressure shaft or spool 136 ("LP shaft 136")

drivingly couples the LP turbine 130 and the LP compressor 122. The LP shaft 136 can also couple to a fan spool or shaft 138 of the fan section 116. In some examples, the LP shaft 136 is coupled directly to the fan shaft 138 (e.g., a direct-drive configuration). In alternative configurations, the LP shaft 136 can couple to the fan shaft 138 via a reduction gear 139 (e.g., an indirect-drive or geared-drive configuration).

As shown in FIG. 1, the fan section 116 includes a plurality of fan blades 140 coupled to and extending radially outwardly from the fan shaft 138. An annular fan casing or nacelle 142 circumferentially encloses the fan section 116 and/or at least a portion of the core turbine 114. The nacelle 142 can be supported relative to the core turbine 114 by a plurality of circumferentially-spaced apart outlet guide vanes 144. Furthermore, a downstream section 146 of the nacelle 142 can enclose an outer portion of the core turbine 114 to define a bypass airflow passage 148 therebetween.

As illustrated in FIG. 1, air 150 enters an inlet portion 152 of the turbofan engine 110 during operation thereof. A first portion 154 of the air 150 flows into the bypass airflow passage 148, while a second portion 156 of the air 150 flows into the inlet 120 of the LP compressor 122. One or more sequential stages of LP compressor stator vanes 170 and LP compressor rotor blades 172 coupled to the LP shaft 136 progressively compress the second portion 156 of the air 150 flowing through the LP compressor 122 en route to the HP compressor 124. Next, one or more sequential stages of HP compressor stator vanes 174 and HP compressor rotor blades 176 coupled to the HP shaft 134 further compress the second portion 156 of the air 150 flowing through the HP compressor 124. This provides compressed air 158 to the combustion section 126 where it mixes with fuel and burns to provide combustion gases 160.

The combustion gases 160 flow through the HP turbine 128 where one or more sequential stages of HP turbine stator vanes 166 and HP turbine rotor blades 168 coupled to the HP shaft 134 extract a first portion of kinetic and/or thermal energy therefrom. This energy extraction supports operation of the HP compressor 124. The combustion gases 160 then flow through the LP turbine 130 where one or more sequential stages of LP turbine stator vanes 162 and LP turbine rotor blades 164 coupled to the LP shaft 136 extract a second portion of thermal and/or kinetic energy therefrom. This energy extraction causes the LP shaft 136 to rotate, thereby supporting operation of the LP compressor 122 and/or rotation of the fan shaft 138. The combustion gases 160 then exit the core turbine 114 through the exhaust section 132 thereof. A turbine frame 161 with a fairing assembly is located between the HP turbine 128 and the LP turbine 130. The turbine frame 161 acts as a supporting structure, connecting a high-pressure shaft's rear bearing with the turbine housing and forming an aerodynamic transition duct between the HP turbine 128 and the LP turbine 130. Fairings form a flow path between the high-pressure and low-pressure turbines and can be formed using metallic castings (e.g., nickel-based cast metallic alloys, etc.).

Along with the turbofan engine 110, the core turbine 114 serves a similar purpose and is exposed to a similar environment in land-based gas turbines, turbojet engines in which the ratio of the first portion 154 of the air 150 to the second portion 156 of the air 150 is less than that of a turbofan, and unducted fan engines in which the fan section 116 is devoid of the nacelle 142. In each of the turbofan, turbojet, and unducted engines, a speed reduction device (e.g., the reduction gear 139) can be included between any shafts and spools. For example, the reduction gear 139 is disposed between the LP shaft 136 and the fan shaft 138 of the fan section 116.

As described above with respect to FIG. 1, the turbine frame 161 is located between the HP turbine 128 and the LP turbine 130 to connect the high-pressure shaft's rear bearing with the turbine housing and form an aerodynamic transition duct between the HP turbine 128 and the LP turbine 130. As such, air flows through the turbine frame 161 between the HP turbine 128 and the LP turbine 130.

FIG. 2 is an illustration of a partial cross-sectional view of an example compressor 200 of a turbine engine (e.g., turbofan engine 110 of FIG. 1), including an example LP compressor (e.g., booster) stage 202 and an example HP compressor stage 204. FIG. 2 illustrates the example compressor 200 at a transition point 206 between the booster stage 202 and the HP compressor stage 204. The compressor 200 includes an example casing 208. In the illustrated example of FIG. 2, the casing 208 surrounds the booster stage 202 and the HP compressor stage 204. In additional or alternative examples, the booster stage 202 and the HP compressor stage 204 have distinct casings 208 connected via a linkage mechanism. The casing 208 surrounds rotor blades 210 of the compressor 200. In operation, the rotor blades 210 spin, impelling air downstream. The casing 208 defines an example mainstream flowpath 212 (e.g., a first flowpath) for airflow through compressor 200 (e.g., and the turbofan engine 110).

FIG. 2 illustrates an example VBV port (e.g., passage, opening, duct, etc.) 214 that defines an example bleed flowpath (e.g., secondary flowpath) 216. The bleed flowpath 216 includes an example VBV port exit 218. In many VBV assemblies, a VBV door 220 and corresponding VBV actuation system 222 are located adjacent a VBV port exit 218. The VBV actuation system 222 causes the VBV door 220 (e.g., blocker door, etc.) to move to a position that covers the VBV port exit 218, closing the VBV port 214 to block airflow from flowing through the bleed flowpath 216. The VBV actuation system 222 may include a lever (e.g., a bell crank, etc.) and linkages, which increase a weight and cost of the VBV assembly and consume unnecessary space. In some examples, such a VBV assembly results in an example bleed cavity 224 when in a closed position, which may disrupt airflow as the air flows through the mainstream flowpath 212. For example, the bleed cavity 224 may cause acoustic resonance, which can lead to compressor instabilities.

Advantageously, examples disclosed herein eliminate the VBV actuation system 222 to increase available space and decrease a weight of the VBV assembly. Certain examples disclosed herein include an example VBV door gap (not shown in connection with FIG. 2; illustrated in the example views of FIGS. 4A and 4B) where the VBV actuation system 222 rests. The VBV door gap allows the VBV door 220 to slide in and out between an open position and a closed position to eliminate or otherwise reduce a volume of the bleed cavity 224. For example, the VBV door gap may allow the VBV door 220 to remain flush with the casing 208 in a closed position, thus eliminating and/or limiting the impacts of the bleed cavity 224 on the mainstream flowpath 212.

Figure 3A:
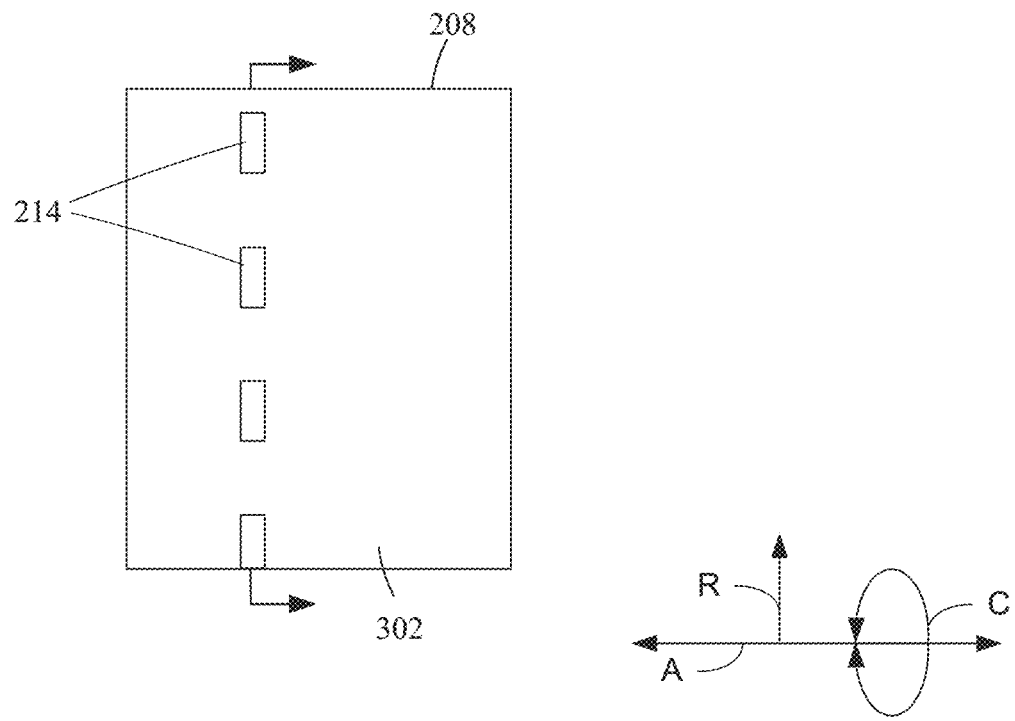
FIGS. 3A and 3B illustrate an example casing for a compressor, including example variable bleed valve ports for which examples disclosed herein may be implemented.
Figure 3B:
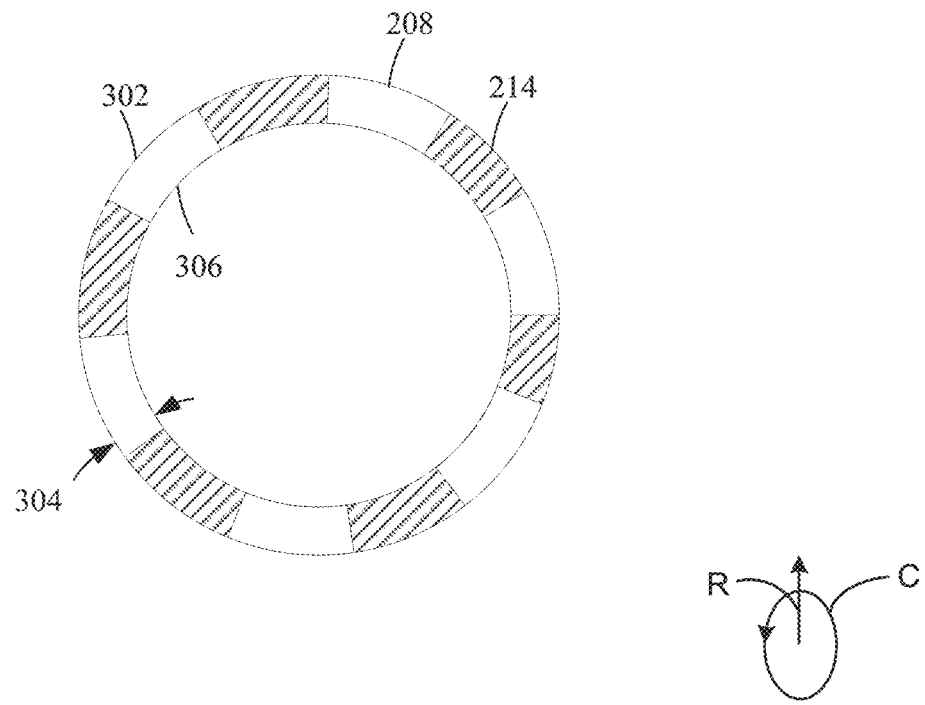

FIGS. 3A and 3B illustrate partial cross-sectional views of an example casing (e.g., casing 208 of FIG. 2) for a compressor (e.g., compressor 200 of FIG. 2) of a turbine engine (e.g., turbofan engine 110 of FIGS. 1 and/or 2). The casing 208 surrounds the compressor 200 at a transition point 206 between a booster stage 202 and a HP compressor stage 204. As such, the casing 208 includes one or more integrated VBV ports 214. For example, the casing 208 may include between 8 and 18 VBV ports 214. In some examples, the number of VBV ports 214 integrated into the casing 208 may correspond to a strut count of the turbofan engine 110. In some examples, the VBV port 214 is machined into the casing 208. In some examples, the VBV port 214 is integrated into the casing 208 by an additive manufacturing process.

FIG. 3A is a radial cross-sectional view of an example outer surface 302 of the casing 208. As illustrated in FIG. 3A, the plurality of VBV ports 214 are spaced circumferentially about the casing 208 at a substantially same axial and radial position. FIG. 3B is a circumferential cross-sectional view of the casing 208 along the line A-A of FIG. 3A. An example thickness 304 of the casing 208 extends from an example inner surface 306 of the casing 208 to the outer surface 302 of the casing 208. As seen in FIG. 3B, the VBV ports 214 extend through the thickness 304 of the casing 208. Typically, a VBV assembly is integrated onto the casing 208, which defines a variable bleed valve.

In some examples, the VBV assembly includes an example controller (not illustrated in examples disclosed herein). The controller may be structured to monitor the compressor 200 to identify a speed-speed mismatch between the booster stage 202 and the HP compressor stage 204. For example, the controller may identify a mismatch between a spool of the booster stage 202 and a spool of the HP compressor stage 204. The controller may be a human and/or monitoring circuitry controlled by an electronic compute device such a computer. In response to identifying the speed-speed mismatch, the controller may be structured to actuate the VBV assembly. For example, the controller may cause an actuator to move the VBV assembly between a closed position and an open position to allow air to bleed from the booster stage 202 (e.g., via the VBV ports 216). The controller may be structured to cause the actuator to move the VBV assembly from the open position to the closed position to stop air from bleeding from the booster stage 202.

Various example VBV assemblies in accordance with the teachings of this disclosure are described in further detail below. Examples disclosed below are applied to the example compressor 200 of the example turbofan engine 110 as described in FIGS. 2, 3A, and 3B. Accordingly, examples disclosed below include the example casing 208, which defines the mainstream flowpath 212, and the example VBV port(s) 214, which defines the example bleed flowpath 216. It is understood, however, that examples disclosed herein may be implemented in one or more compressors, such as a high pressure compressor, a low pressure compressor, etc. Further, examples disclosed herein may be implemented on a compressor having a variety of configurations, such as including one or more VBV ports, compressor stages, etc. Further, examples disclosed herein may be applied to a variety of turbine engines, such as a multi-spool turbine engine, a turboshaft engine, turbine engines with one compressor section, etc. Examples disclosed below may include the controller to determine to actuate the VBV assemblies disclosed herein.

Figure 4A:
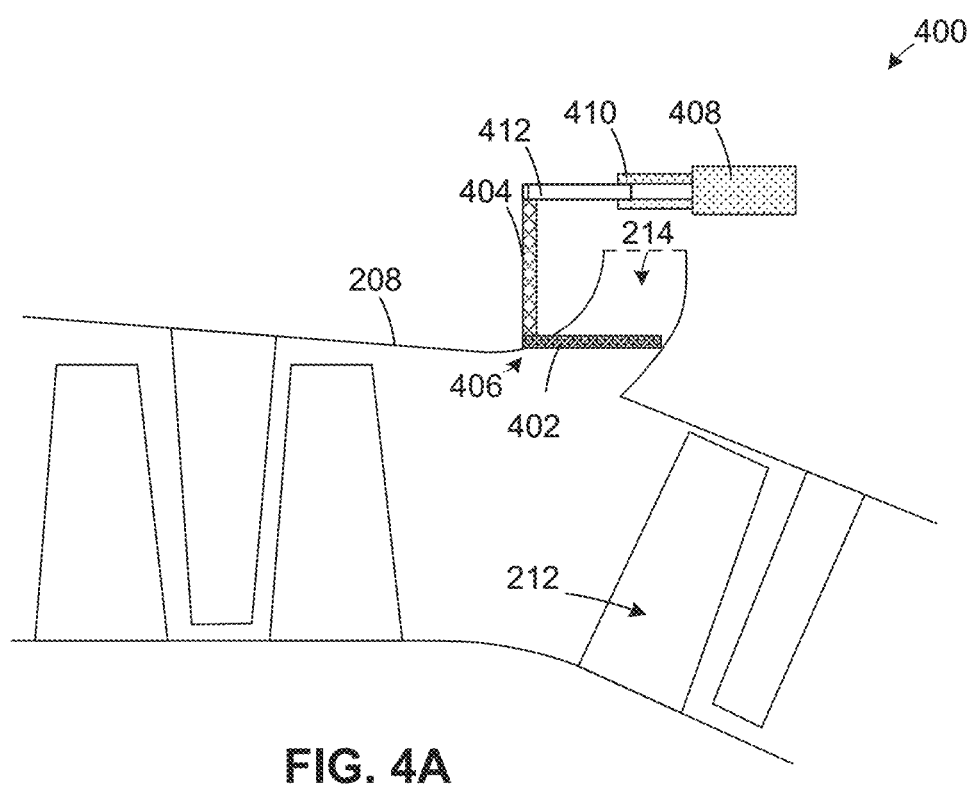
FIGS. 4A and 4B illustrate an example variable bleed valve assembly structured in accordance with the teachings of this disclosure.
Figure 4B:
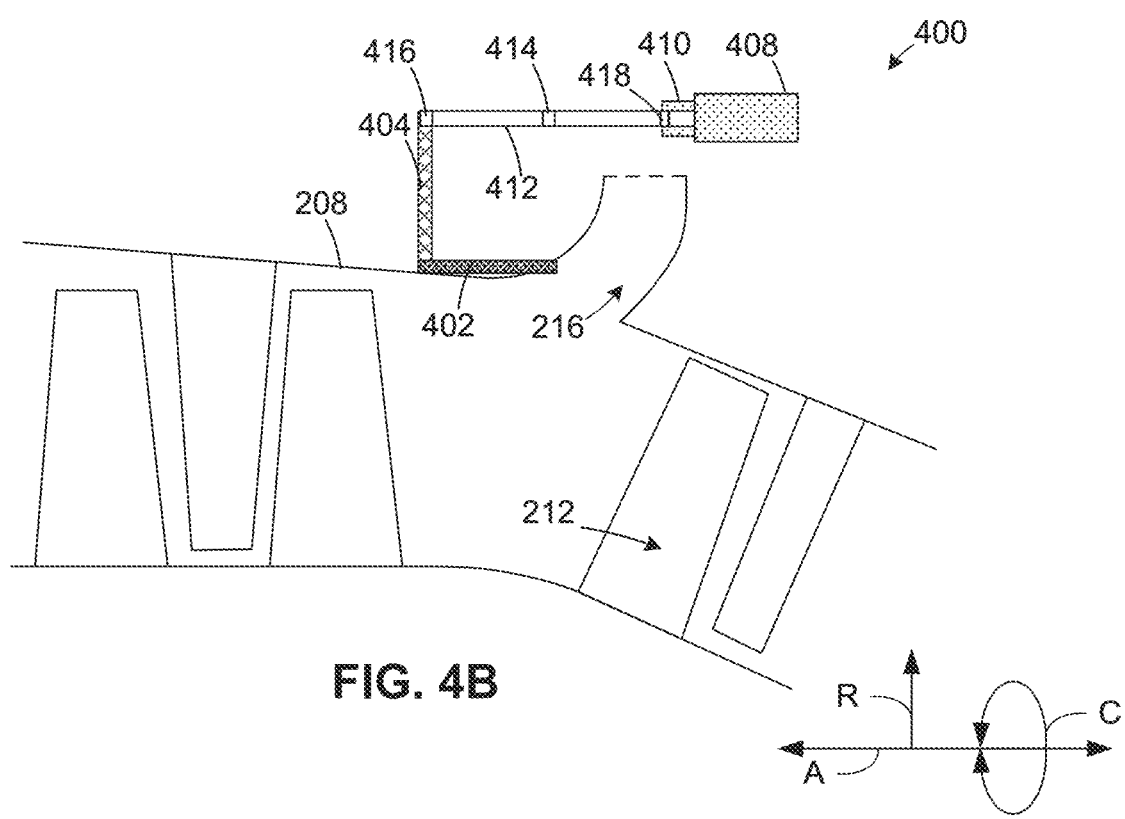

FIGS. 4A and 4B are schematic illustrations of an example VBV assembly 400 structured in accordance with the teachings of this disclosure. The example VBV assembly 400 is positioned radially outward from the example casing 208, which includes one or more VBV ports 214. Each VBV port 214 defines a bleed flowpath 216 that enables bleed air to escape the booster stage 202. The VBV assembly 400 includes at least one example VBV door 402 coupled to an example unison ring 404 (e.g., actuation ring). The VBV doors 402 are structured to cover the VBV ports 214 in a closed position. The unison ring 404 is structured to move the VBV doors 402 between a first position to a second position to uncover the VBV port(s) 214, allowing air to bleed from the booster stage 202. Any number of VBV doors 402 may be included. For example, the quantity of VBV doors 402 may correspond to the quantity of VBV ports 214 (e.g., from 8 to 24 VBV doors). In some examples, multiple VBV ports 214 may share a VBV door 402. Accordingly, certain examples have a different quantity of VBV doors 402 than VBV ports 214. The VBV assembly 400 is structured to close of the VBV port 214 radially inward from the VBV port 214. As such, the VBV assembly 400 includes an example VBV door gap 406. In some examples, the unison ring 404 is operatively coupled to an example actuator 408 (e.g., via an example actuator rod 410). The example actuator 408 may be a linear actuator, hydraulic actuator, pneumatic actuator, power screw, etc.

The example VBV assembly 400 of FIGS. 4A and 4B includes an example bell crank (e.g., and/or another intermediary device) 412. The bell crank 412 is an assembly having two linkage points (e.g., each at an end of an arm) connected at a pivot point. The bell crank 412 is structured to change a direction of a force through an angle. For example, an L-shaped bell crank 412 having a 90 degree angle may transmit an axial pulling force on a first arm of the bell crank 412 to a radial pulling force on a second arm by rotating the arms about a pivot point (e.g., example fixed pivot point 414). It is understood, however, that the bell crank 412 may be configured with any angle between 0 degrees and 360 degrees. The direction of transmittal of force may vary depending on the angle.

In the illustrated example of FIGS. 4A and 4B, the bell crank 412 is positioned radially outward from the example casing 208. In some examples, the bell crank 412 maybe positioned at an angle relative to an example unison ring 404. The example bell crank 412 includes three example connection points: an example fixed pivot point 414, an example VBV door point 416, and an example actuation point 418. The example fixed pivot point 414 is connected to the turbofan engine 110 such that the bell crank 412 can pivot about the fixed pivot point 414. The fixed pivot point 414 may be connected to the turbofan engine 110 using a stationary connection point of the turbofan engine 110, such as a wall extending radially outward from the casing 208, etc. In the illustrated example of FIGS. 4A and 4B, the unison ring 404 is operatively coupled to an example VBV door point 416 of the bell crank 412. An upstream end of the VBV door 402 is coupled to the unison ring 404. The actuation point 418 is operatively coupled to the actuator 408 via the example actuator rod 410.

In operation, the actuator 408 moves between a first position (e.g., a closed position of FIG. 4A such that airflow is blocked from entering the VBV port 214) and a second position (e.g., an open position of FIG. 4B such that airflow can move into the VBV port 214). In some examples, the actuator 408 moves in an axial direction. In some examples, the actuator 408 moves in an axial-radial direction. However, the actuator 408 may be configured to move in other direction(s) capable of causing the VBV assembly 400 to open and/or close the VBV port 214. The movement of the actuator 408 from the first position to the second position pulls the bell crank 412 via the actuator rod 410, at which the bell crank 412 pivots about the fixed pivot point 414. As the bell crank 412 pivots about the fixed pivot point 414, the bell crank 412 pulls the unison ring 404, which causes the unison ring 404 to move from the first position to the second position in an circumferential/axial component direction. The movement of the unison ring 404 from the first (e.g., closed) position to the second (e.g., open) position causes the VBV door 402 to move from the first position to the second position. In other words, the actuator 408 causes the bell crank 412 to pivot about the fixed pivot point 414, which pulls and/or pushes the unison ring 404 and the VBV door 402. To move towards an open position, the VBV door 402 slides circumferentially/axially-upstream from the VBV door gap 406.

To move the VBV assembly 400 to the first position, the actuator 408 moves from the second position to the first position, which causes the bell crank 412 to pivot about the fixed pivot point 414, causing a pushing force on the unison ring 404. The pushing force on the unison ring 404 causes the unison ring 404 to move from the second position to the first position in a circumferential/axial component direction, which applies a pushing force on the VBV door 402. The pushing force on the VBV door 402 causes the VBV door 402 to slide through the VBV door gap 406 towards the first (e.g., closed) position. While moving towards the closed position, the VBV door 402 moves in a circumferential/axially-downstream direction. In operation, the VBV assembly 400 may be moved towards a partially-open position and/or a partially-closed position. That is, the VBV doors 402 may be actuated to be partially open and/or partially closed.

The VBV assembly 400 of FIGS. 4A and 4B can be configured in a variety of arrangements. In some examples, a single actuator 408 is operatively coupled to a single bell crank 412, which is operatively coupled to a single unison ring 404 that operatively and circumferentially links every VBV door 402 of the VBV assembly 400. In some examples, the unison ring 404 may be operatively coupled to a plurality of bell cranks 412 and/or actuators 408. In some such examples, the plurality of bell cranks 412 and/or actuators 408 move concurrently to provide additional force to move the actuator 408 and VBV doors 402. In some examples, the VBV assembly 400 includes more than one unison ring 404, each unison ring 404 having a corresponding actuator 408 and bell crank 412. In some such examples, each unison ring 404 may operatively and circumferentially link a plurality of VBV doors 402. In other words, some examples enable a subset of VBV doors 402 to be linked and actuated via distinct unison rings 404. In some examples, the VBV door 402 extends circumferentially around the unison ring 404, such that a single unison ring 404 and a single VBV door 402 can cover the plurality of VBV ports 214. In some examples, the VBV door 402 extends circumferentially about the unison ring 404 to cover a plurality of VBV ports 214 less than all the VBV ports 214. Some such examples may include more than one unison ring 404, each unison ring 404 having a VBV door 402 that covers one or more VBV ports 214.

FIGS. 5A and 5B illustrate a partial radially-inward view of the example VBV assembly 400 of FIGS. 4A and 4B. In some examples, the VBV assembly 400 includes a plurality of VBV doors 402 that are coupled to the unison ring 404 and spaced circumferentially apart. In the illustrated examples of FIGS. 5A and 5B, the VBV door 402 is structured to cover a plurality of VBV ports 214. In some examples, more than one VBV door 402 is coupled to the unison ring 404, each VBV door 402 corresponding to more than one VBV port 214. The unison ring 404 is operatively coupled to an example bell crank 412 and an example actuator 408. FIGS. 5A and 5B illustrate the circumferential/axial motion of the unison ring 404 and VBV door(s) 402.

FIG. 5A illustrates the example VBV assembly 400 in a closed position. In the closed position, the unison ring 404 is axially downstream relative to the unison ring 404 in an open position. In operation, the actuator 408 pulls the bell crank 412, which pulls the unison ring 404 about the fixed pivot point 414. Such force causes the unison ring 404 to move in an example circumferential/axially-upstream direction to move the unison ring 404 from the closed position to the open position. The movement of the unison ring 404 pulls the VBV door(s) 402 in the circumferential/axially-upstream direction out of an example VBV door gap (not pictured).

FIG. 5B illustrates the example VBV assembly 400 in an open position. In the open position, the unison ring 404 is axially upstream relative to the unison ring 404 in an close position. In operation, the actuator 408 pushes the bell crank 412, which pushes the unison ring 404 about the actuation point 418. Such force causes the unison ring 404 to move in a circumferential/axially-downstream direction to move the unison ring 404 from the open position to the closed position. The movement of the unison ring 404 pushes the VBV door(s) 402 circumferentially/axially-downstream into the example VBV door gap (not pictured).

The VBV assembly 400 of FIGS. 4A-4B and 5A-5B can be configured in a variety of additional or alternative arrangements. In some examples, the VBV assembly 400 includes more than one unison ring 404, each unison ring 404 having a corresponding actuator 408. In such examples, each unison ring 404 may operatively and circumferentially link a plurality VBV doors 402. In other words, some examples enable a subset corresponding VBV doors 402 to be linked and actuated via distinct unison rings 404.

Additional and/or alternative example VBV assemblies and/or configurations are disclosed below. The example VBV assemblies disclosed below are similar to the VBV assembly 400 of FIGS. 4A and 4B. As such, the details of the parts (e.g., casing 208, VBV port(s) 214, VBV door(s) 402, unison ring(s) 404, example actuator(s) 408, etc.) are not repeated in connection with FIGS. 6A-12. Further, the same reference numbers used for the structures shown in FIGS. 2-5B are used for similar or identical structures in FIGS. 6A-12. Similar to FIGS. 2-5B, examples below are integrated onto a casing 208 of a compressor 200, which defines a mainstream flowpath 212 for airflow through the turbofan engine 110.

FIGS. 6A and 6B are schematic illustrations of another example VBV assembly 600 structured in accordance with the teachings of this disclosure. The example VBV assembly 600 is positioned radially outward from the example casing 208, which includes one or more VBV ports 214. The VBV assembly 600 includes at least one example VBV door 402 coupled to an example unison ring 404. The unison ring 404 is structured to move the VBV doors 402 between a first position to a second position to uncover the VBV port(s) 214, allowing air to bleed from the booster stage 202. The example unison ring 404 is structured to actuate the plurality of VBV doors 402 concurrently.

Figure 9A:
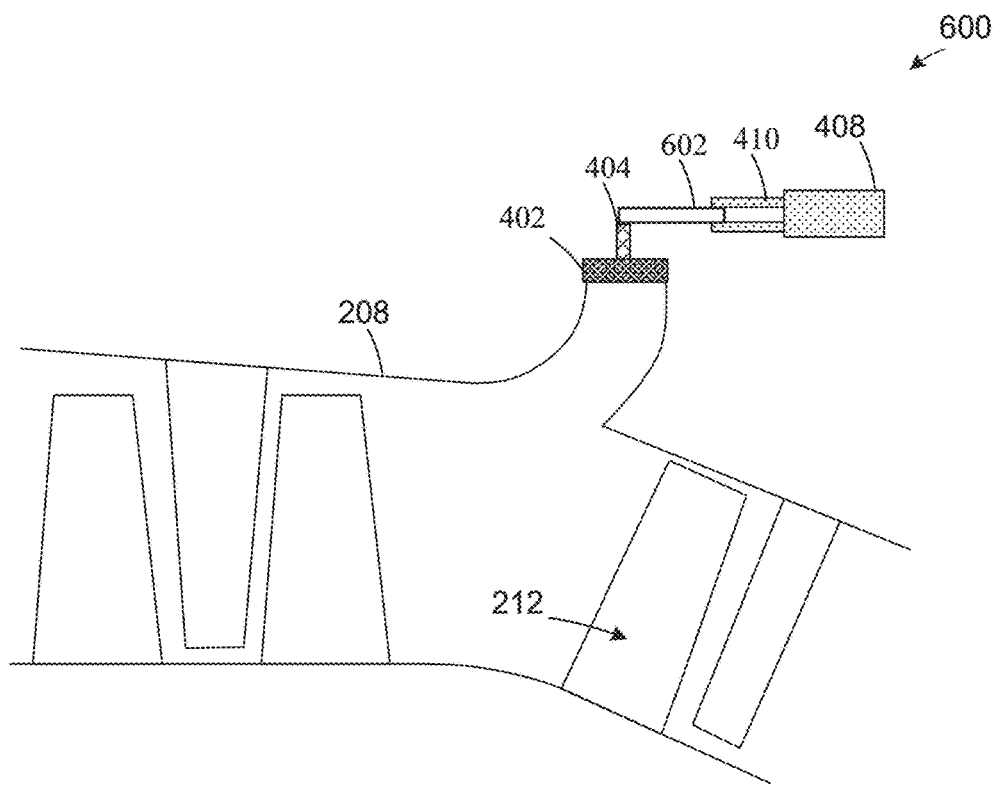
FIGS. 9A and 9B illustrate the example variable bleed valve assembly of FIGS. 6A and 6B structured in accordance with the teachings of this disclosure.
Figure 9B:
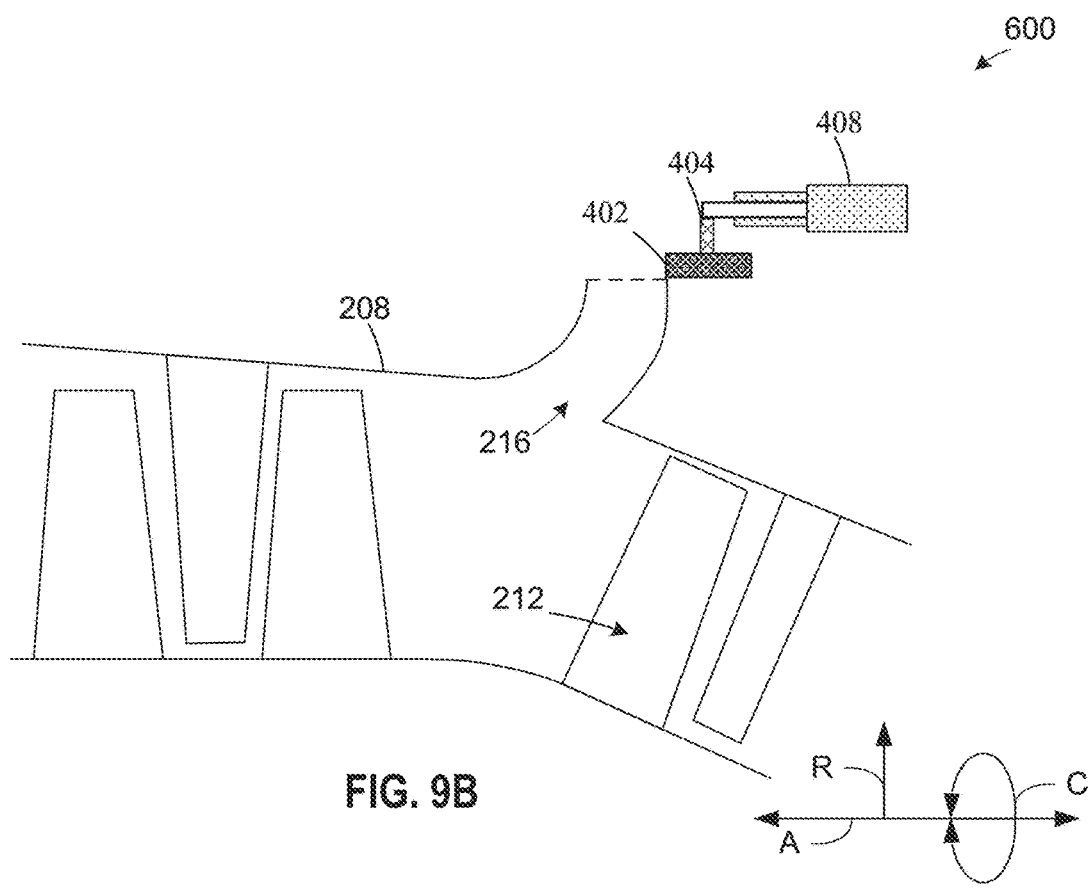

In the illustrated example of FIGS. 6A and 6B, the unison ring 404 moves in a circumferential direction. In some examples, the unison ring 404 moves in an axial direction (as illustrated in FIGS. 9A and 9B). In some examples, the unison ring 404 is operatively coupled to an example actuator 408 (e.g., via an example actuator rod 410 and an example connection arm(s) 602). The actuator 408 may be in any position that enables the actuator to cause the unison ring 404 to move in a circumferential and/or axial direction. In some examples, the unison ring 404 is operatively coupled to more than one actuator 408. For example, the unison ring 404 may be operatively coupled to a first actuator 408 and a second actuator 408, wherein the second actuator 408 is an additional and/or alternative actuator 408 that may act as a back-up actuator 408.

In operation, the VBV assembly 600 moves between a first position (e.g., a closed position of FIG. 6A whereby airflow is blocked from entering the VBV port 214) and a second position (e.g., an open position of FIG. 6B whereby airflow can move into the VBV port 214). That is, the actuator 408 moves between the first position and the second position, causing the unison ring 404 to move (e.g., in a circumferential direction) between the first position and the second position. The movement of the unison ring 404 from the first position to the second position causes the VBV doors 402 to move from the first (e.g., closed) position to the second (e.g., open) position. To move towards an open position, the VBV doors 402 slides circumferentially to uncover the VBV port 214.

To move the VBV assembly 600 to the first position, the actuator 408 moves from the second position to the first position, which causes the unison ring 404 to move from the second position to the first position (e.g., in a circumferential direction). Such movement causes the VBV doors 402 to slide circumferentially towards the first (e.g., closed) position, covering the VBV ports 214 in the process. In operation, the VBV assembly 600 may be moved towards a partially-open position and/or a partially-closed position. That is, the VBV doors 402 may be actuated to be partially open and/or partially closed.

The VBV assembly 600 of FIGS. 6A and 6B can be configured in a variety of additional or alternative arrangements. In some examples, the VBV assembly 600 includes more than one unison ring 404, each unison ring 404 having a corresponding actuator 408. In such examples, each unison ring 404 may operatively and circumferentially link a plurality VBV doors 402. In other words, some examples enable a subset corresponding VBV doors 402 to be linked and actuated via distinct unison rings 404. Further, the unison ring 404 may be actuated in any manner that causes the unison ring 404 to move in the circumferential or axial direction.

FIGS. 7A and 7B are partial, circumferential views of the example VBV assembly 600 of FIGS. 6A and 6B. As illustrated in FIGS. 7A and 7B, the example VBV doors 402 are coupled to the example unison ring 404, which surrounds the example casing 208. In the illustrated examples of FIGS. 7A and 7B, the unison ring 404 (e.g., and VBV doors 402) moves in a circumferential motion about the casing 208. In operation, the unison ring 404 of FIGS. 7A and 7B remains in substantially the same axial and radial position.

FIG. 7A illustrates the VBV assembly 600 in a first (e.g., closed) position (e.g., as illustrated in FIG. 6A). FIG. 7B illustrates the VBV assembly 600 in a second (e.g., open) position (e.g., as illustrated in FIG. 6B). In operation, the unison ring 404 moves circumferentially from the first position of FIG. 7A towards the second position of FIG. 7B.

FIG. 8 is a partial view of the VBV assembly 600 of FIGS. 6A-6B, FIGS. 7A-7B, and/or FIGS. 9A-9B. The unison ring 404 may be made of a metal or a composite. For example, the unison ring 404 may be made manufactured using a titanium metal. In some examples, the uniron ring 404 is made using a thermoplastic or an organic composite such as a Polymeric, Bismaleimide, or Polyimide composite. The plurality of VBV doors 402 are coupled to the unison ring 404 via example linkage(s) 802. In some examples, the linkage 802 may include at least one fastener, such as a screw, a bolt, etc. In some examples, the linkage 802 is a weld. In some examples, the linkage 802 includes rivets and/or an adhesive bond. The VBV door(s) 402 may be made of a composite.

FIGS. 9A and 9B illustrate the example VBV assembly 600 of FIGS. 6A, 6B, and/or 8. The VBV assembly 600 includes at least one example VBV door 402, the example unison ring 404, and the example actuator 408. In the illustrated examples of FIGS. 9A and 9B, the VBV assembly 600 is structured to move in an axial direction.

In operation, the VBV assembly 600 moves between a first position (e.g., a closed position of FIG. 9A whereby airflow is blocked from entering the VBV port 214) and a second position (e.g., an open position of FIG. 9B whereby airflow can move into the VBV port 214). That is, the actuator 408 moves between the first position and the second position, causing the unison ring 404 to move (e.g., in an axial direction) between the first position and the second position. The movement of the unison ring 404 from the first position to the second position causes the VBV doors 402 to move from the first (e.g., closed) position to the second (e.g., open) position. To move towards an open position, the VBV assembly 600 slides axially to uncover the VBV port(s) 214. In some examples, the VBV assembly 600 slides axially upstream of the VBV port 214. In other examples, the VBV assembly 600 slides axially downstream of the VBV port 214.

To move the VBV assembly 600 to the first position, the actuator 408 moves from the second position to the first position, which causes the unison ring 404 to move from the second position to the first position in an axial direction. Such movement causes the VBV door 402 to slide axially towards the first (e.g., closed) position, covering the VBV ports 214 in the process. In operation, the VBV assembly 600 may be moved towards a partially-open position and/or a partially-closed position. That is, the VBV doors 402 may be actuated to be partially open and/or partially closed.

Figure 10A:
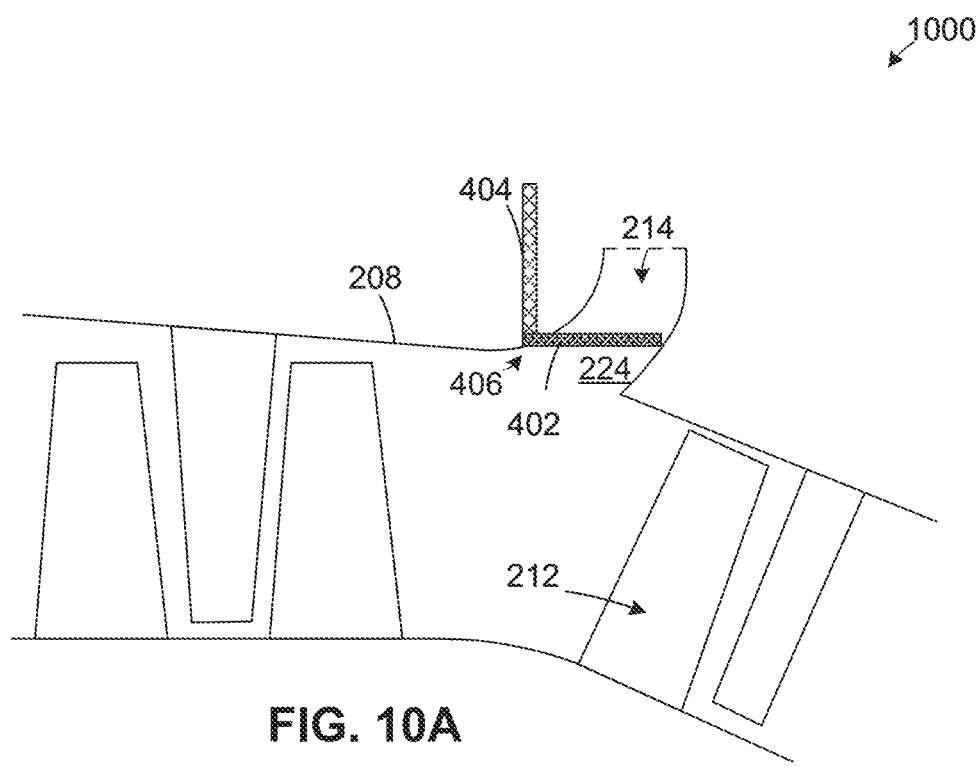
FIGS. 10A and 10B illustrate variations another example variable bleed valve assembly structured in accordance with the teachings of this disclosure.
Figure 10B:
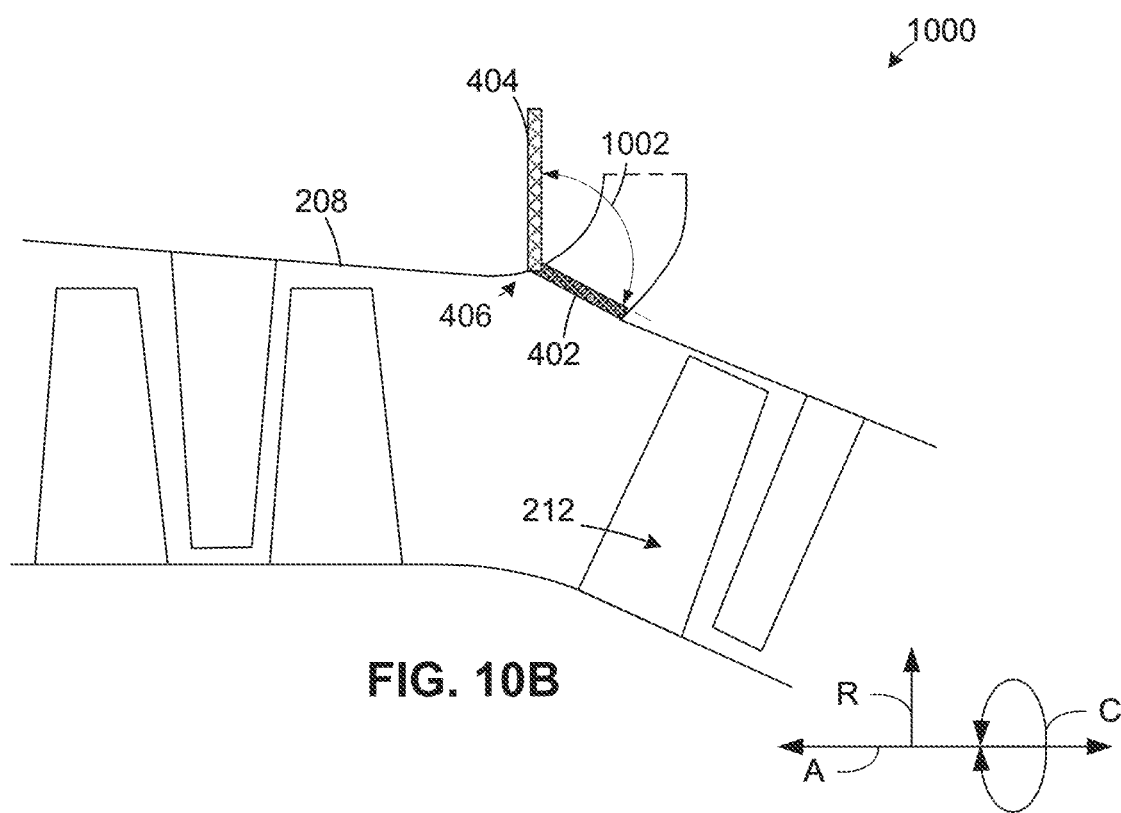

FIGS. 10A and 10B illustrate another example VBV assembly 1000 structured in accordance with the teachings of this disclosure. The VBV assembly 1000 includes an example unison ring 404, at least one example VBV door 402 coupled to the unison ring 404, and an example actuator 408 (not shown). The example casing 208 includes at least one VBV port 214 that defines a bleed flowpath 216. The VBV assembly 1000 is similar to the VBV assembly 600 of FIGS. 6A-6B through 9A-9B. However, the VBV assembly 1000 is structured to close of the VBV port 214 radially inward from the VBV port 214. As such, the VBV assembly 1000 includes an example VBV door gap 406.

In the illustrated example of FIGS. 10A and 10B, the unison ring 404 is positioned radially outward from the example casing 208 and upstream of the VBV ports 214. In some examples, the unison ring 404 may be positioned in another location, such as downstream of the VBV ports 214. The VBV door(s) 402 are positioned radially outward from the example casing 208. In an open position, the VBV doors 402 are positioned circumferentially adjacent the VBV ports 214.

FIG. 10A illustrates the VBV door 402 perpendicularly coupled to the unison ring 404. In such an example, the VBV door 402 may not be flush with a wall of the casing 208 resulting in a bleed cavity 224. FIG. 10B illustrates the VBV door 402 coupled to the unison ring 404 at an angle 1002. In some such examples, the angle 1002 is such that the VBV door 402 is flush or substantially flush with the wall of the casing 208 in a closed position. For example, a substantially flush relationship may be within 3 degrees of being flush. However, the angle 1002 can be any angle that does not extend the VBV door 402 beyond the casing 208. That is, the VBV door 402 may be in a position that stops air from flowing through the VBV port 214 in a closed position. Although not shown in the illustrated examples of FIGS. 10A and 10B, an actuator 408 is operatively coupled to the example unison ring 404. The actuator 408 may be in any position that enables the actuator to move the unison ring 404 in a circumferential direction.

FIGS. 11A and 11B illustrate a partial radially-inward view of the example VBV assembly 1000 of FIGS. 10A and 10B. FIGS. 11A and 11B illustrate a plurality of VBV doors 402 that are coupled to the unison ring 404 and spaced circumferentially apart. The unison ring 404 is operatively coupled to an actuator 408 (not shown in the example views of FIGS. 11A and 11B but shown in the example views of FIGS. 6A and 6B). FIGS. 11A and 11B illustrate the circumferential motion of the unison ring 404 and VBV doors 402.

FIG. 11A illustrates the example VBV assembly 1000 in a closed position. In the closed position, the unison ring 404 is in substantially the same axial and radial position as the unison ring in the open position.

In operation, the actuator 408 moves between a first position (e.g., a closed position whereby airflow is blocked from entering the VBV port 214) and a second position (e.g., an open position whereby airflow can move into the VBV port 214). The movement of the actuator 408 from the first position to the second position causes the unison ring 404 to move in a circumferential direction from the first (closed) position to the second (open) position. The movement of the unison ring 404 causes VBV door 402 to slide from the first position in the circumferential direction away from the VBV port 214, towards the second position. In other words, the actuator 408 causes the unison ring 404 and corresponding VBV door(s) 402 to slide between the first and second positions. To move towards an open position, the VBV door 402 slides circumferentially away from the VBV port 214.

FIG. 11B illustrates the example VBV assembly 1000 in an open position. To move the VBV assembly 1000 back to the closed position, the actuator 408 moves from the second position to the first position, which causes the unison ring 404 move in a circumferential direction opposite the circumferential direction that moved the unison ring to the open position. Such movement causes the VBV door 402 slide circumferentially towards the first (closed) position. In operation, the VBV assembly 1000 may be moved towards a partially-open position and/or a partially-closed position. That is, the VBV doors 402 may be actuated to be partially open and/or partially closed.

FIG. 11B also illustrates an example circumferential VBV port length 1102, an example circumferential VBV door length 1104, and an example circumferential spacing length 1106. The circumferential VBV port length 1102 is a length of the VBV port 214 in a circumferential direction. The circumferential VBV door length 1104 is a length of the VBV door 402 in the circumferential direction. The circumferential VBV port length 1102 is equal to or less than the circumferential VBV door length 1104. That is, the circumferential VBV door length must be at least equal to, if not larger than the circumferential VBV port length 1102 in order to cover the VBV port 214 in a closed position. In some examples, the VBV door 402 does not include a uniform length in the axial direction. For example, the VBV door may slope in length, having a larger length towards the unison ring 404. In such examples, a minimum VBV door length 1104 would be at least equal to, if not larger than the circumferential VBV port length 1102 to cover the VBV port 214 in a closed position. In such examples, the VBV door length 1104 may slope towards a longer VBV door length.

The circumferential spacing length 1106 is greater than or equal to the circumferential VBV door length 1104. That is, the circumferential spacing length 1106 must be at least the same size as the circumferential VBV door length 1104 so that the VBV door 402 does not overlap with more than one VBV port 214. Further, such a configuration allows the VBV door 402 to be in a position in which the VBV door 402 does not cover any VBV port.

Figure 12:
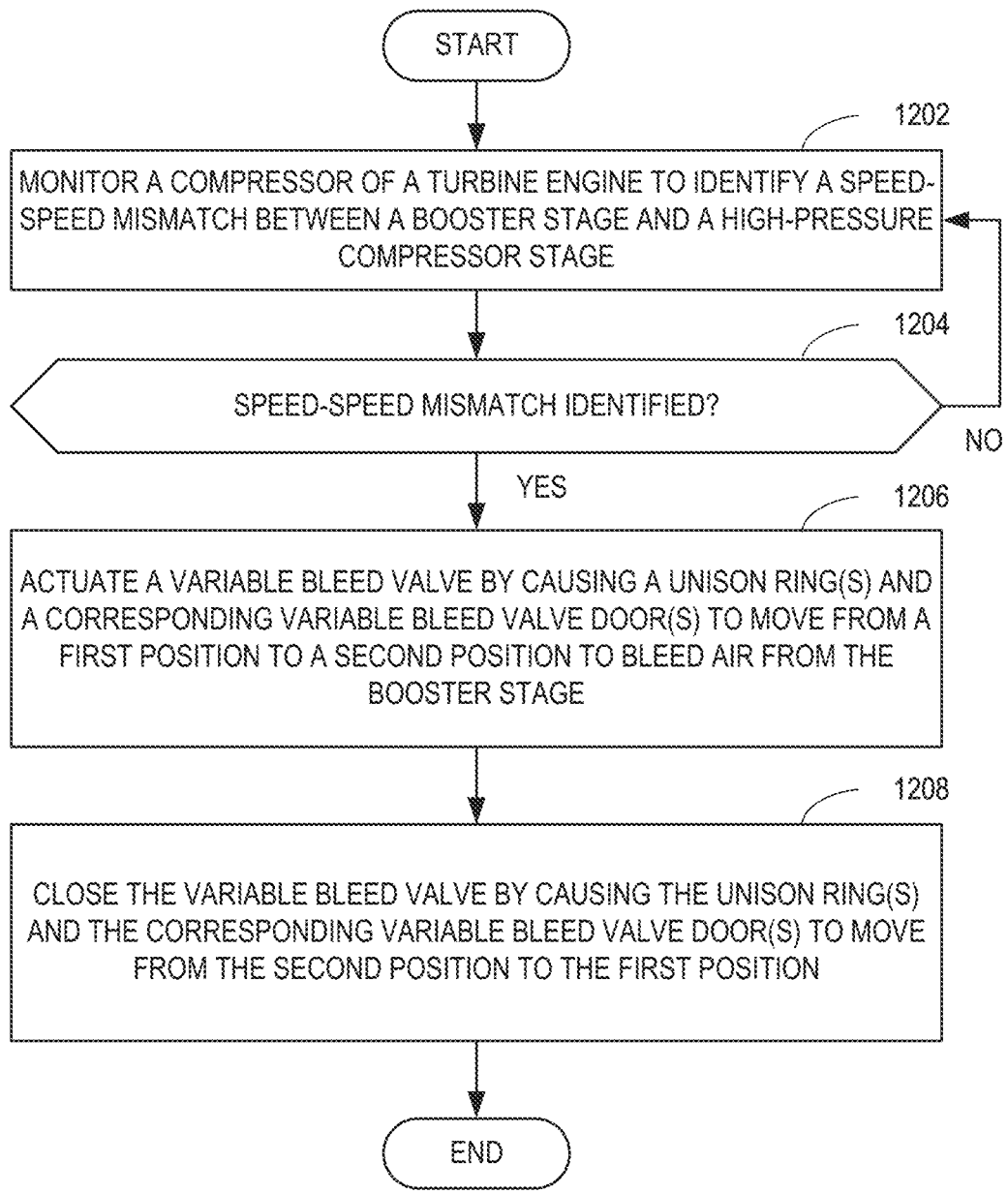
FIG. 12 is a flowchart representative of an example method for actuating a variable bleed valve assembly, such as those VBV assemblies of FIGS. 4A-11B.

FIG. 12 is a flowchart representative of an example method 1200 to control an example VBV assembly (e.g., VBV assembly 400, 600, 1000). In some examples, the method 1200 begins at block 1202 at which a controller monitors a compressor (e.g., compressor 200) of a turbine engine (e.g., turbine engine 110) to identify a speed-speed mismatch between a booster stage (e.g., booster stage 202) and a high-pressure compressor stage 204 (e.g., HP compressor). The controller may be a human and/or monitoring circuitry controlled by an electronic compute device such a computer. The speed-speed mismatch may occur during a throttling change of the turbine engine 110, such as during start-up and/or stopping of the turbine engine 110.

At block 1204, the controlled determines whether the speed-speed mismatch has been identified. If the answer to block 1204 is no, controlled advances back to block 1202 at which the controller continues to monitor the compressor 200. If the answer to block 1204 is YES, control advances to block 1206. At block 1206, the controller actuates a variable bleed valve (e.g. a VBV assembly 400, 600, 1000) by causing a unison ring(s) (e.g., unison ring 404) and a corresponding VBV door(s) (e.g., VBV door(s) 402) to move from a first (e.g., closed) position to a second (e.g., open) position to bleed air from the booster stage 202. At block 1208, the controller closes the VBV assembly 400, 600, 1000 by causing the unison ring(s) 404 and corresponding VBV door(s) 402 to move from the second (e.g., open) position to the first (e.g., closed) position.

Example VBV assemblies 400, 600, 1000 disclosed above have a variety of features. In some examples, a sliding door (e.g., VBV door 402) is used to open and/or close a VBV port 214. In some examples, the VBV door 402 slides through a VBV door gap 406. In some examples, the VBV door 402 is flush with a casing 208 in a closed position. Accordingly, some examples close off a bleed cavity 224 in a closed position. The VBV door 402 may move in various axial and/or circumferential component directions. Some examples enable a VBV assembly 400, 600, 1000 to move a sub-set of VBV doors 402 between the open position and closed position.

Although each example VBV assembly 400, 600, 1000 disclosed above has certain features, it should be understood that it is not necessary for a particular feature of one example VBV assembly 400, 600, 1000 to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features. Features of the example VBV assemblies 400, 600, 1000 disclosed above may be combined, divided, re-arranged, omitted, eliminated, and/or implemented in any other way.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example systems, apparatus, and articles of manufacture have been disclosed that enable manufacture of an advantageous VBV assembly. Examples disclosed herein enable actuation of a VBV door that is flush with a casing in a closed position thereby eliminating a bleed cavity. Examples disclosed herein enable actuation of a VBV door that limits an impact of the bleed cavity on mainstream airflow. Examples disclosed herein enable manufacture of a variety of VBV assemblies that may be configured according to a specific turbine engine. Accordingly, examples disclosed herein enable improved operability and efficiency of a turbine engine, enable aerodynamic benefits, and improve stall margin.

Further aspects of the present disclosure are provided by the subject matter of the following clauses:

Example 1 includes an apparatus comprising a variable bleed valve (VBV) door associated with a VBV bleed port, and a first unison ring, the VBV door coupled to the first unison ring, the first unison ring to move in a circumferential direction between a first position and a second position to move the VBV door between the first position and the second position.

Example 2 includes the apparatus of any preceding clause, further including an actuator coupled to the first unison ring to cause the first unison ring to move between the first position and the second position.

Example 3 includes the apparatus of any preceding clause, wherein the first unison ring moves in an axial direction between the first position and the second position.

Example 4 includes the apparatus of any preceding clause, wherein the VBV door slides between the first position and the second position.

Example 5 includes the apparatus of any preceding clause, wherein the first position is a closed position and the second position is an open position.

Example 6 includes the apparatus of any preceding clause, further including a plurality of VBV doors corresponding to a plurality of VBV bleed ports, ones of the plurality of VBV doors associated with respective ones of the plurality of VBV bleed ports, the plurality of VBV doors spaced circumferentially apart and coupled to the first unison ring.

Example 7 includes the apparatus of any preceding clause, wherein the plurality of VBV doors are positioned aft of the plurality of VBV bleed ports.

Example 8 includes the apparatus of any preceding clause, wherein the plurality of VBV doors includes a first portion of the plurality of VBV doors and a second portion of the plurality of VBV doors, the first portion of the plurality of VBV doors operatively coupled to the first unison ring, the apparatus further including a second unison ring, the second portion of the plurality of VBV doors operatively coupled to the second unison ring, and a second actuator operatively coupled to the second unison ring, the second actuator to move between the first position and the second position to cause the second unison ring to move between the first position and the second position to cause the second portion of the plurality of VBV doors to move between the first position and the second position.

Example 9 includes a turbine engine comprising a casing having an inner surface and an outer surface, the casing to define a flow path for the turbine engine, the casing having a plurality of air bleed slots, and a variable bleed valve system, including: a plurality of VBV doors corresponding to the plurality of air bleed slots, and a bleed ring, ones of the plurality of VBV doors coupled to the bleed ring, the bleed ring to move in a circumferential direction between a closed position and an open position to move the VBV doors between the closed position and the open position.

Example 10 includes the turbine engine of any preceding clause, wherein the ones of the plurality of VBV doors cover respective ones of the plurality air bleed slots in the closed position.

Example 11 includes the turbine engine of any preceding clause, wherein the VBV doors are substantially flush with the flow path in the closed position.

Example 12 includes the turbine engine of any preceding clause, wherein the ones of the plurality of VBV doors at least partially uncover respective ones of the plurality air bleed slots in the open position.

Example 13 includes the turbine engine of any preceding clause, wherein the bleed ring moves in a circumferential-axial component direction between the closed position and the open position to move the VBV doors between the closed position and the open position.

Example 14 includes the turbine engine of any preceding clause, further including an actuator, the actuator to cause the bleed ring to move between the closed position and the open position.

Example 15 includes the turbine engine of any preceding clause, wherein the bleed ring is a first bleed ring and wherein the plurality of VBV doors includes a first portion of the plurality of VBV doors and a second portion of the plurality of VBV doors, the first portion of the plurality of VBV doors coupled to the first bleed ring, the turbine engine further including a second bleed ring, the second portion of the plurality of VBV doors coupled to the second bleed ring, and a second actuator operatively coupled to the second bleed ring, the second actuator to move between the closed position and the open position to cause the second bleed ring to move between the closed position and the open position to move the second portion of the plurality of VBV doors between the closed position and the open position.

Example 16 includes the turbine engine of any preceding clause, further including an intermediary device positioned between the bleed ring and the actuator, the intermediary device operatively coupled to the actuator at a first end and operatively coupled to the bleed ring at a second end.

Example 17 includes the turbine engine of any preceding clause, wherein the actuator moves between the open position and the closed position to cause the intermediary device to move between the open position and the closed position to cause the bleed ring and the plurality of VBV doors to move between the open position and the closed position.

Example 18 includes the turbine engine of any preceding clause, wherein the intermediary device is a bellcrank.

Example 19 includes the turbine engine of any preceding clause, wherein the ones of the plurality of VBV doors slide between the closed position and the open position.

Example 20 includes a method comprising monitoring a compressor of a turbine to identify a speed-speed mismatch between a booster stage and a high-pressure stage, in response to identifying the speed-speed mismatch between the booster stage and the high-pressure stage, actuating a variable bleed valve (VBV) by causing a unison ring having at least one VBV door to move from a first position to a second position to bleed air from the booster stage, and closing the VBV by causing the unison ring having the least one VBV door to move from the second position to the first position to stop bleeding air from the booster stage.

Although certain example systems, apparatus, and articles of manufacture have been disclosed herein, the scope of coverage of this patent is not limited thereto. On the contrary, this patent covers all systems, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus in a turbine engine, the turbine engine defining a longitudinal centerline axis and an axial direction parallel to the longitudinal centerline axis and a circumferential direction concentrically around the longitudinal centerline axis, the apparatus comprising:
a first variable bleed valve (VBV) door;
a second VBV door spaced circumferentially apart relative to the first VBV door; and
a first unison ring movable between a first position and a second position, each of the first VBV door and the second VBV door coupled to the first unison ring such that movement of the first unison ring from the first position to the second position causes the first and second VBV doors to move from the first position to the second position, the first position of the first unison ring and the first and second VBV doors located axially downstream and circumferentially shifted relative to the second position of the first unison ring and the first and second VBV doors, the first VBV door oriented within a first gap defined in a first VBV bleed port in the first position and in the second position, the second VBV door oriented within a second gap defined in a second VBV bleed port in the first position and in the second position.

2. The apparatus of claim 1, further including an actuator coupled to the first unison ring to cause the first unison ring to move between the first position and the second position.

3. The apparatus of claim 1, wherein the first position is a closed position and the second position is an open position.

4. The apparatus of claim 1, further including a third VBV door circumferentially spaced apart relative to the first VBV door and the second VBV door.

5. The apparatus of claim 1, wherein the first gap is defined in a forward wall of the first VBV port and positioned proximate a casing defining a primary flowpath of the turbine engine.

6. The apparatus of claim 5, wherein the second gap is defined in a forward wall of the second VBV port and positioned proximate the casing.

7. The apparatus of claim 1, wherein the first unison ring is movable to a third position to move the first VBV door and the second VBV door to the third position, and the third position of the first VBV door and the second VBV door is located axially upstream of the first position and axially upstream of the second position.

8. The apparatus of claim 1, wherein a third VBV door is oriented within a third gap defined in a third VBV bleed port in the first position and the second position, the third VBV bleed port spaced circumferentially apart relative to the second VBV port.

9. The apparatus of claim 1, wherein the first unison ring and the first VBV door are coupled to form an angle therebetween, and wherein the angle between the first unison ring and the first VBV door is the same in the first position and the second position.

10. A turbine engine defining a longitudinal centerline axis and an axial direction parallel to the longitudinal centerline axis and a circumferential direction concentrically around the longitudinal centerline axis, the turbine engine comprising:
a casing defining a flow path for the turbine engine, the casing having a plurality of air bleed slots spaced circumferentially apart from one another; and
a variable bleed valve (VBV) system, including:
each VBV door of a plurality of VBV doors associated with a first position, each VBV door of the plurality of VBV doors movable to a second position that is axially downstream and circumferentially rotated relative to the first position, wherein each VBV door is movable within a respective air bleed slot of the plurality of air bleed slots such that the plurality of VBV doors are positioned relative to the respective air bleed slots in the first position and the second position;
wherein each air bleed slot of the plurality of air bleed slots includes a respective forward wall and a gap defined in the forward wall, each VBV door positioned within the respective air bleed slot via the respective gap; and a bleed ring, the plurality of VBV doors coupled to the bleed ring, the bleed ring movable axially downstream and circumferentially rotated from the first position to the second position to cause the plurality of VBV doors to move from the first position to the second position.

11. The turbine engine of claim 10, wherein respective VBV doors of the plurality of VBV doors cover respective air bleed slots of the plurality of air bleed slots in the second position.

12. The turbine engine of claim 10, wherein the plurality of VBV doors are substantially flush with the flow path in the second position.

13. The turbine engine of claim 10, further including a first actuator coupled to the bleed ring, the first actuator to cause the bleed ring to move between the first position and the second position.

14. The turbine engine of claim 13, further including a second actuator, each of the first actuator and the second actuator coupled to the bleed ring to cause the bleed ring to move between the first position and the second position.

15. The turbine engine of claim 13, further including an intermediary device positioned between the bleed ring and the first actuator, the intermediary device operatively coupled to the first actuator at a first end and operatively coupled to the bleed ring at a second end.

16. The turbine engine of claim 15, wherein the intermediary device is a bellcrank.

17. The turbine engine of claim 15, wherein the first actuator is structured to move between the first position and the second position to cause the intermediary device to move between the first position and the second position to cause the bleed ring and the plurality of VBV doors to move between the first position and the second position.

18. The turbine engine of claim 10, wherein the bleed ring is movable to a third position to cause the plurality of VBV doors to move to the third position, the third position axially between the first and second positions.

19. A method comprising:

a turbine engine, the turbine engine defining a longitudinal centerline axis and an axial direction parallel to the longitudinal centerline axis and a circumferential direction concentrically around the longitudinal centerline axis, the turbine engine comprising an apparatus comprising:

a first variable bleed valve (VBV) door;

a second VBV door spaced circumferentially apart relative to the first VBV door; and a first unison ring movable between a first position and a second position, each of the first VBV door and the second VBV door coupled to the first unison ring such that movement of the first unison ring from the first position to the second position causes the first and second VBV doors to move from the first position to the second position, the first position of the first unison ring and the first and second VBV doors located axially downstream and circumferentially shifted relative to the second position of the first unison ring and the first and second VBV doors, the first VBV door oriented within a first gap defined in a first VBV bleed port in the first position and in the second position, the second VBV door oriented within a second gap defined in a second VBV bleed port in the first position and in the second position;

the method further comprising:

monitoring a compressor of the turbine engine to detect a speed-speed mismatch between a booster stage and a high-pressure stage;

actuating the apparatus based on the detection, the actuating including causing the first unison ring having the first VBV door and the second VBV door coupled thereto to move axially and circumferentially from the first position to the second position to bleed air from the first VBV bleed port and the second VBV bleed port each positioned between the booster stage and the high-pressure stage, the first VBV door oriented within the first gap defined in a wall of the first VBV bleed port such that the first VBV door can slidably move within the first VBV bleed port through the first gap, the second VBV door oriented within the second gap defined in a wall of the second VBV bleed port such that the second VBV door can slidably move within the second VBV bleed port through the second gap, the first VBV door and the second VBV door in a first axial location and a first circumferential location in the first position and the first VBV door and the second VBV door in a second axial location and a second circumferential location in the second position, the first axial location located axially downstream relative to the second axial location, the first circumferential location shifted relative to the second circumferential location; and closing the first VBV bleed port and the second VBV bleed port by causing the first unison ring to move axially and circumferentially from the second position to the first position to stop bleeding air from the first VBV bleed port and the second VBV port.

* * * * *